(12) United States Patent
Carter et al.

(10) Patent No.: US 8,336,420 B2
(45) Date of Patent: Dec. 25, 2012

(54) THREE-AXIS ROBOTIC JOINT USING FOUR-BAR LINKAGES TO DRIVE DIFFERENTIAL SIDE GEARS

(75) Inventors: Troy Alexander Carter, Mountian View, CA (US); Akhil J. Madhani, Pasadena, CA (US); Arthur Stanley Brigham, Sunnyvale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 455 days.

(21) Appl. No.: 12/792,014

(22) Filed: Jun. 2, 2010

(65) Prior Publication Data
US 2011/0296944 A1 Dec. 8, 2011

(51) Int. Cl.
*B25J 17/02* (2006.01)
*B25J 18/00* (2006.01)
(52) U.S. Cl. ............... 74/490.05; 74/490.01; 901/27
(58) Field of Classification Search ........... 74/490.01, 74/490.05; 901/27, 28
See application file for complete search history.

(56) References Cited

U.S. PATENT DOCUMENTS

| | | | |
|---|---|---|---|
| 3,391,801 A * | 7/1968 | Haaker | 414/7 |
| 4,095,481 A * | 6/1978 | Kasai et al. | 74/469 |
| 4,739,241 A * | 4/1988 | Vachtsevanos et al. | 318/568.19 |
| 4,782,258 A | 11/1988 | Petrosky | |
| 4,790,718 A * | 12/1988 | Vickers | 414/735 |
| 4,946,421 A | 8/1990 | Kerley, Jr. | |
| 5,157,316 A | 10/1992 | Glovier | |
| 5,245,885 A | 9/1993 | Robertson | |
| 5,318,471 A | 6/1994 | Glovier | |
| 5,740,699 A * | 4/1998 | Ballantyne et al. | 74/490.06 |
| 6,454,624 B1 | 9/2002 | Duff et al. | |
| 6,658,962 B1 * | 12/2003 | Rosheim | 74/490.05 |
| 7,398,707 B2 | 7/2008 | Morley et al. | |
| 7,540,799 B1 * | 6/2009 | Trojan | 451/8 |
| 7,628,093 B2 | 12/2009 | Madhani et al. | |
| 7,658,246 B2 * | 2/2010 | Takenaka et al. | 180/8.6 |
| 7,734,375 B2 * | 6/2010 | Buehler et al. | 700/245 |
| 2007/0021031 A1 | 1/2007 | Madhani | |

* cited by examiner

*Primary Examiner* — Justin Krause
(74) *Attorney, Agent, or Firm* — Marsh Fischmann & Breyfogle, LLP; Kent A. Lembke

(57) ABSTRACT

A robotic joint configured as a 3-axis joint. The joint includes an input roll assembly and a pitch-output roll assembly. The pitch-output roll assembly includes: a housing; a differential mechanism including left and right input gears, an output gear, a cross element interconnecting the gears, and a clevis supporting the gears and the cross element; a left four-bar linkage coupled to the left input gear; a right four-bar linkage coupled to the right input gear; and first and second linear actuators connected to the left and right four-bar linkages. The first and second linear actuators selectively drive the left and right input gears to rotate the output gear about an output roll axis and to rotate the cross element about a pitch axis passing through the cross element and input gears. A linear actuator in the input roll assembly rotates the pitch-output roll housing about an input roll axis.

19 Claims, 18 Drawing Sheets

THREE-AXIS ROBOTIC JOINT USING FOUR-BAR LINKAGES TO DRIVE DIFFERENTIAL SIDE GEARS

BACKGROUND

1. Field of the Description

The present description relates, in general, to robotic joints, and, more particularly, to a robotic joint using linear actuators in combination with four-bar linkages to drive side gears of a differential to provide a 3-axis joint that replicates movements of a human or human-like shoulder joint with a similar form factor, e.g., the robotic joint and linear electrical actuators can be mounted within a structure or shell having human or similar dimensions and/or form.

2. Relevant Background

There are many applications for robotic joints. Many characters or figures including those found in theme parks are animated with limbs that move using robotic joints. Effective animated figures, e.g., animatronic figures that are human or human-like such as characters given human qualities and movements, have been created using robotics. However, it has proven difficult to design a robotic joint that can effectively simulate human joints and, particularly, human shoulders, hips, elbows, and similar joints. For example, difficulties with designing robotic shoulder joints include the relatively tight or small form factor provided by the figure's structure at or near the shoulder. For example, a character with human or similar proportions would need to contain all the components of the shoulder joint and internal machinery within the skin or covering over the shoulder or nearby such as in the body cavity (e.g., within the form of the human body or the character body). Another shoulder design challenge involves providing the range of motion provided by human and other similar shoulder joints at the same speed and providing arms or limbs with desired strength, e.g., similar or greater than a human.

Early industrial robotics used hydraulic actuators. While appearing in general shape and function to be "arms" that rotate about a shoulder joint, most designs had no form factor constraints similar to a human body's external envelope constraint. As a result, hydraulic actuator-based robotics designed for industrial use generally do not lend themselves to use with joints simulating human joints or representing a human shape or its shoulder function. Hydraulic actuators include a hydraulic power supply made up of an electric pump, an oil tank, filters, accumulators, and associated components. The power supply is used to create a high pressure source of hydraulic fluid that is piped to a manifold that houses a series of hydraulic servo valves, which meter oil to hydraulic cylinders placed local to each joint or axis of motion of a robot or animated figure. A control computer may be used to provide commands or control signals to the various servo valves to achieve a desired movement of the hydraulically actuated joint.

Hydraulically actuated robotic joints have a number of advantages including the high power density (e.g., high power or force for a given size) of hydraulic cylinders. Also, these joints are relatively easy to design and use in part because they may be attached simply by using spherical rod ends that make it easy to create pivoting joints. These robotic joints also have long lives since the contacting elements include sliding seals that are intrinsically oil lubricated. Hydraulically actuated robotic joints have many offsetting disadvantages including the fact that hydraulic systems are typically messy and dirty as they leak oil that attracts dirt and stains the animatronic figure including the joints, skins, clothing, and/or other figure finishing. Oil also causes skin materials to break down and can be a fire hazard. These joints may be dangerous to operate due to the high pressure oil used for power that potentially can spray out of holes in joints and hoses injuring passersby (e.g., guests of a theme park, maintenance personnel, and others nearby to the animatronic figures). Use of hydraulic actuators requires the use of a hydraulic power unit that may be noisy and require pumps, tanks, filters, piping, and cooling mechanisms. It is often hard to run the needed and numerous hydraulic lines through and around the joints due to limited flexibility and size of tubing that can handle the high operating pressures. Also, the achievable servo bandwidth is limited by the compressibility associated with the length of hydraulic lines between the servo valves and the hydraulic cylinders, and further, the servo valves are too large to fit within the external envelope or to conform to a desired form factor of a human or other animatronic figure. Additionally, it is difficult to make such figures mobile or portable due to the size and noise associated with the hydraulic infrastructure.

Due to these limitations, electric motors have been used for at least the past twenty years in place of hydraulic actuators in commercial robotics. However, a number of problems have made it difficult to design a proper form factor robotic shoulder joint. In electric actuators, electronic amplifiers are commanded to supply specified currents to electric motors. The motor is typically placed local or in the joint of the robot or animated figure. As with hydraulic actuators, the commands or control signals provided to the amplifiers are generally provided by one or more controllers or control computers. Electric actuators have the advantage over hydraulic actuators of being clean and easy to maintain. Also, the behavior of electric motors is well understood and is useful for creating repeatable and controllable motions. With electric actuators, it is relatively easy to monitor force output using motor currents, which is helpful in certain control tasks and allows use of simple methods to limit output force to ensure safety.

Unfortunately, electric actuators typically have lower power density when compared with hydraulic actuators making it difficult to achieve desired accelerations. To achieve high power, electric motors must operate at high speed, and this requires a speed reduction mechanism. As a result, electric actuators often require complicated mechanical designs or configurations because of the speed reduction required between the motor and the joint and due to the form factor of the electric motor. Other joint designs have driven the differential with cables or gears but have placed the drive motors or actuators in or near the joint, which makes compliance with the form factor difficult and also undesirably increases moving inertia as the motor mass moves along with the joint components. This, in turn, reduces achievable accelerations or motion performance and can also reduce load carrying capacities.

Some efforts have been made to address form factor using a cable-type transmission to drive differential side gears in a robotic joint, but such designs are often difficult to design to provide a very high cycle life, which is required for many applications such as theme parks and other entertainment and industrial applications. In other cases, geared differentials are used to drive robotic joints but use bevel gears, which does not address human form-factor packaging constraints (e.g., is typically only suited to industrial applications with little or no size/packing constraints). Hence, electric actuators have not proven widely useful for creating shoulder and other "human" joints due to difficulty in complying with the associated form factors and due to power and speed constraints. Further, existing humanoid robots may have a human-like appearance but do not meet human form factor requirements and may also differ from humans in their shape, range of motion performance, and/or degrees-of-freedom.

There remains a need for an improved mechanism for use as a shoulder joint in robots or animatronic figures or characters. Preferably, the mechanism would simulate the movement and functionality of a human shoulder joint and would be configured to comply with the form factor of a human shoulder or human-like proportions for a shoulder (e.g., within the robotic figure's shoulder and body cavity or structure). Additionally, it is preferable that the shoulder mechanism be safe and clean to operate.

SUMMARY

The present invention addresses the above problems by providing a 3-axis robotic joint particularly suited for simulating movement of a human shoulder and similar joints. The axes of the 3-axis robotic joints described herein include input roll, pitch, and output roll, and a centrally-located geared differential mechanism is utilized to provide controlled motion about the axes of motion. Significantly, the geared differential mechanism is driven through the use of two linear actuators that each drive a four-bar linkage to drive one of the side gears of the differential mechanism to provide movement about the pitch and output roll axes. Further, a four-bar linkage is operated by a first electric linear actuator to cause the entire differential mechanism to rotate about an input roll axis of the robotic joint. The use of four-bar linkages enables the robotic joint to obtain a high power density compared to a belt, to achieve higher ranges of motion than with a bell crank, and to be designed/fabricated with less complexity than a rack and pinion or other linear-to-rotary transmission.

Briefly, a robotic joint (e.g., shoulder joint in some examples) is provided that uses a combination of: (1) a geared differential mechanism; (2) four-bar linkages to drive the side gears of the differential; and (3) electric linear actuators to drive the four-bar linkages, which, as a result of the linkage connection to the side gears, drives the differential mechanism to obtain motion about three axes. Such a combination has not previously been used in a robotic joint. Use of four-bar linkages to drive the differential side gears beneficially allows the shoulder to be designed such that its output range of motion is equivalent to a human shoulder while remaining within a human form-factor and using only high cycle-life components. One of the key observations made by the inventor to enable the described robotic joint is that a four-bar linkage can be used in combination with a geared differential to achieve human-equivalent range-of-motion. This is particularly the case when the linkages are driven by compact, electric linear actuators. For example, in some shoulder joint implementations, the robotic joint has a range of motion that is approximately twice that of a typical or conventional robotic figure presently in use.

More particularly, a robotic joint is provided that is configured as a 3-axis joint or a roll-pitch-roll joint. Briefly, the joint includes an input roll assembly with an actuator mechanism providing input roll motion and a pitch-output roll assembly providing both pitch and output roll motion. In one embodiment, the pitch-output roll assembly includes: a housing; a differential mechanism positioned in the housing, including left and right input gears, an output gear, a cross element interconnecting the gears, and a clevis supporting the gears and the cross element within the housing; a left four-bar linkage coupled to the left input gear; a right four-bar linkage coupled to the right input gear; and first and second linear actuators connected to the left and right four-bar linkages.

The first and second linear actuators operate to selectively drive the left and right input gears so as to rotate the output gear about an output roll axis and/or to rotate the cross element about a pitch axis passing through the cross element and the input gears. Such rotation may be concurrent or independent. The actuator mechanism of the input roll assembly operates to rotate the housing of the pitch-output roll assembly about an input roll axis extending through the differential mechanism.

In some embodiments of the robotic joint, the first and second linear actuators of the pitch-output roll assembly each include an electric linear actuator with an actuator arm connected to an input link of the corresponding four-bar linkage. The left and right four-bar linkages may each include an output link coupled to the input link via a connecting link and, in such cases, the output links each pivot at an end distal to the connecting link with the pitch axis passing through the pivot end of the output links (i.e., the output link of the linkage pivots about the pitch axis of the joint). The range of rotation of the output gear about the output roll axis may be in the range of about 155 to about 180 degrees while the range of motion of the cross element about the pitch axis may be in the range of about 60 to about 90 degrees. In some cases, the input roll axis, the pitch axis, and the output roll axis intersect within the differential mechanism (e.g., in the cross element). The gears of the differential mechanism may be selected from the group of gears including bevel gears, spiral bevel gears, hypoid gears, miter gears, zerol gears, cable differentials, and friction cones.

In some embodiments, the actuator mechanism of the input roll assembly may be an electric linear actuator. The input roll assembly may further include an input roll axle supporting the housing of the pitch-output roll assembly. The input roll assembly may also include a four-bar linkage with an output link connected to the housing of the pitch-output roll assembly and an input link driven by the electric linear actuator to selectively rotate the housing about the input roll axle. It may also be useful for the input roll axis to extend through the input roll axle such that the housing containing the differential mechanism rotates about the input roll axis.

DETAILED DESCRIPTION

Figure 1:
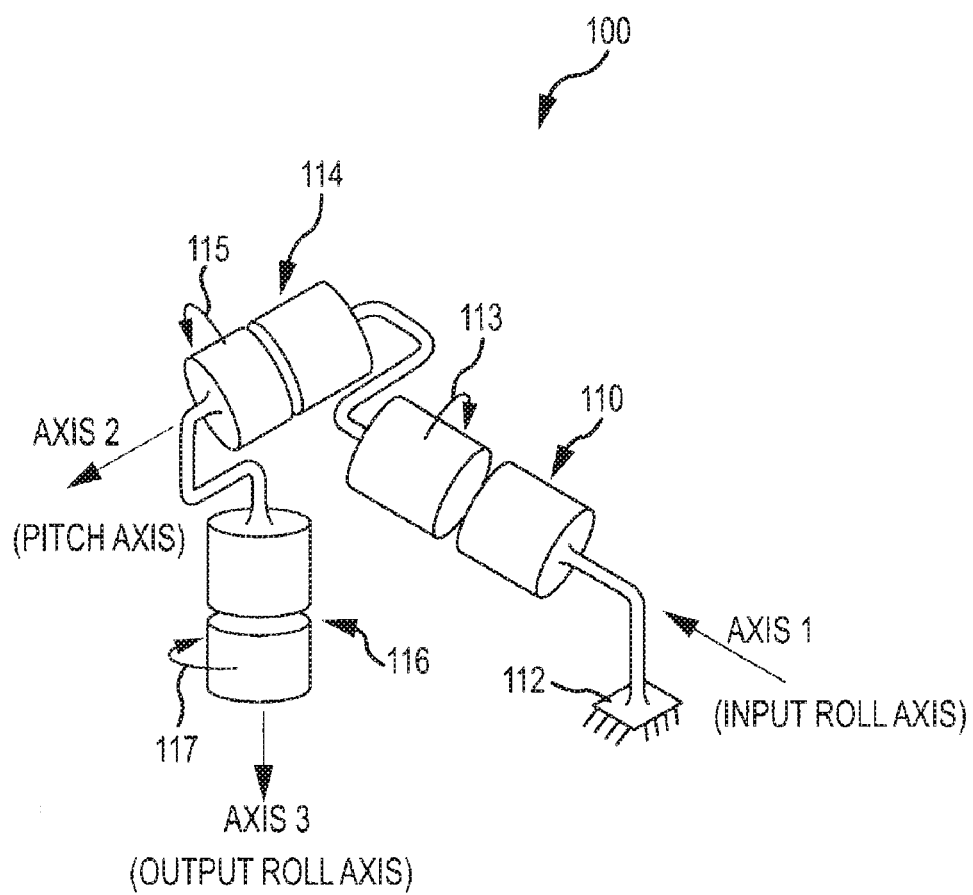
FIG. 1 is a schematic view of a 3-axis joint, as may be provided by an embodiment of a robotic joint or joint assembly, illustrating the three axes and relative rotation of the joint components about such axes.

Briefly, the present invention is directed to a robotic joint assembly with three axes of motion that uses two electric linear actuators to drive the side gears of a geared differential mechanism to provide a roll-pitch-roll joint that is compact. As will become clear from the following description, the robotic joint assembly described and shown in the figures is specifically designed to be physically compact so that it may fit within a human or animal form factor. The complete joint assembly or aspects of the joint may be used to build a shoulder, elbow, hip, knee or other joint as may be typical in humans or animals. In general, the compactness of the joint is useful in any case where overall space savings is important. The joint may also be used as a pointing device to aim a camera, a projector, a laser, or any application where three axes of rotary motion are desired.

The joint or joint assembly is built in a roll-pitch-roll configuration. The center of the joint is a geared differential mechanism which provides two axes of rotation. In addition, rotation of the entire differential mechanism, as a unit, creates a third axis of motion. The differential mechanism may include two bevel "side gears" that are mounted facing each other. Two additional bevel "spider gears" may then be mounted between the side gears such that each spider gear mates with both side gears. In such an application, the side gears of the differential are, or act as, inputs that may then be driven by external actuators. One of the spider gears directly couples to the output. Coincident motion of the differential side gears can create a pitch motion of the output spider gear (i.e., about the central axis of the side gears), while opposing motion causes a rotation of the output spider gear.

One significant advantage of this configuration is that all of the motors for the joint are located on its proximal (closer to the base) side. This reduces moving inertia of the overall joint because the center of gravity of each motor remains essentially fixed during motion of the two distal output axes. In addition, more room is available for the distal joints of a mechanism. In the case of an arm, these distal joints may include the elbow, wrist, and hand.

Of course, there have been other robotic joints built around geared differential mechanisms. In some cases, the inputs to the mechanism are driven with rotary motors driving separate bevel gear sets. In other cases, the differential side gears are driven using stainless steel drive cables. The use of rotary motors to drive the differential side gears is advantageous because unlimited rotation of the gears is possible. However, packaging a rotary motor to do this in a compact manner is difficult. If using bevel gear sets to drive the side gears, the additional gearing introduces additional friction and backlash. If using a toothed belt or a spur gear is used to drive the side gears, the motors will be positioned in a manner which is difficult to make compact. As noted, steel cables may be used to drive the side gears while positioning the motors in a compact manner. However the cables have limited fatigue life and introduce mechanical flexibility into the joint.

In contrast, one interesting feature of the robotic joints described herein is that they are designed to be actuated using linear, as opposed to rotary, actuators. Linear in this sense refers to actuators whose outputs are cylindrical extensions, and these linear actuators are used in the robotic joints described herein to drive all three rotary axes of the joint. In further contrast to prior robotic joints using geared differential mechanisms, the side gears are driven through four-bar linkages in order to use linear actuators while still providing a large output range of motion. The particular linkage used and described provides a mechanical amplification of the linear actuator motion to create large motions of the side gears. This would not be possible if each were driven, for example, by applying a linear actuator to a simple crank arm attached to the side gear rather than using four-bar linkages.

Linear actuators may be implemented in numerous ways to practice the joints taught by the inventor. For example, but without limitation, one may create a linear actuator by using a rotary electric motor that is coupled to a lead screw, either directly or via a gear or belt drive train. These types of actuators are made by manufacturers such as MOOG, Inc. or Exlar, Inc. The screw may be an acme screw, a ball screw, or a roller screw. The actuator may also be a hydraulic cylinder (e.g., driven by a largely incompressible fluid), a pneumatic cylinder (e.g., driven by a compressible fluid such as air), or the like. Other forms of linear actuators may also be used that may be driven by belts or driven directly by electromagnetic force.

Prior to discussing a specific joint (or joint assembly) embodiment, it may be useful to more generally describe operation of a 3-axis joint. FIG. 1 illustrates schematically a 3-axis joint 100 with functionality provided by joints described that utilize four-bar linkages to drive side gears of the geared differential mechanisms. As shown, the joint 100 has three rotational axes in series to provide a roll-pitch-roll configuration. These axes are labeled Axis 1, Axis 2, and Axis 3 and correspond to the input roll axis, pitch axis, and output roll axis, respectively. In the joint 100 (and specific implementations described below), all three axes (Axis 1, Axis 2, and Axis 3) of the joint 100 intersect at a single point, which is located in the central or pitch roll component/assembly 114.

Generally, the joint 100 includes an input roll component or assembly 110, a pitch roll component or assembly 114, and an output roll component or assembly 116. In practice, the input roll assembly 110 is typically supported at one end by a base or support member 112 (e.g., a torso mounting point for a robot when the joint 100 is a shoulder joint and such a base 112 may be fixed or selectively positionable/rotatable). The input roll axis, Axis 1, passes through the input roll assembly 110, and, in operation, the input roll assembly rotates 113 about the input roll axis, Axis 1. The pitch assembly 114 is connected to the input roll assembly 110 such that it, too, rolls with the assembly. The pitch axis, Axis 2, passes through the pitch assembly 114, and, during operation of the joint 100, the pitch assembly 114 rotates or pitches 115 about the pitch axis, Axis 2, to provide a second degree of movement or motion for the assembly 100.

The output roll assembly 116 is linked to the pitch assembly 114 such that it moves with the assembly. Additionally, the output roll axis, Axis 3, passes through the output roll assembly 116. During operation of the assembly 100, the output roll assembly 116 may be caused to rotate 117 about Axis 3, with such movement being independent from the pitch assembly 114 (e.g., the assembly 114 does not rotate 117 with the output roll assembly 116). In the following discussion, the input roll axis, pitch axis, and output roll axis will likewise be referred to as Axis 1, Axis 2, and Axis 3, and the basic operation described for assembly 100 applies to all the described joint embodiments.

The 3-axis robotic joint may be generally thought of as a roll-pitch-roll joint. FIGS. 2A-2H illustrate one implementation of a 3-axis robotic joint 200 that uses linear electric actuators to drive a geared differential mechanism via four-bar linkages to provide motion about the illustrated three axes (i.e., Axis 1 (input roll axis), Axis 2 (pitch axis), and Axis 3 (output roll axis)). Generally, the joint 200 is made up of an input roll assembly 210 and a pitch-output roll assembly 230.

In operation, the input roll assembly 210 functions to rotate the pitch-output roll assembly 230 about Axis 1 (input roll axis). To this end, the input roll assembly 210 includes a mounting frame or arm 212 that allows the input roll assembly 210 to be rigidly or pivotally connected within a larger robotic assembly (such as a human form robot or the like). The mounting frame or arm 212 also is configured to support an electric linear actuator 214 that selectively positions an actuator arm, shaft, or rod 216 extending from one end (e.g., the end proximate to the pitch-output roll assembly 230). The actuator arm 216 is pivotally connected to a four-bar linkage 220 that is rigidly connected to the pitch-output roll assembly 230 (e.g., to a differential input housing or frame 252). Further, an input roll axle (pin, shaft, or the like) 218 is provided on the mounting frame or arm 212 (but is not readily visible in FIGS. 2A-2H), and Axis 1 (input roll axis) extends along the central, longitudinal axis of this input roll axle, which extends through the four-bar linkage 220. Hence, during use, when the linear actuator 214 operates to move the actuator arm 216, the four-bar linkage 220 is rotated about axle 218 so as to rotate the connected differential input housing 252 (and the entire pitch-output roll assembly 230) about Axis 1 (input roll axis).

Figure 2A:
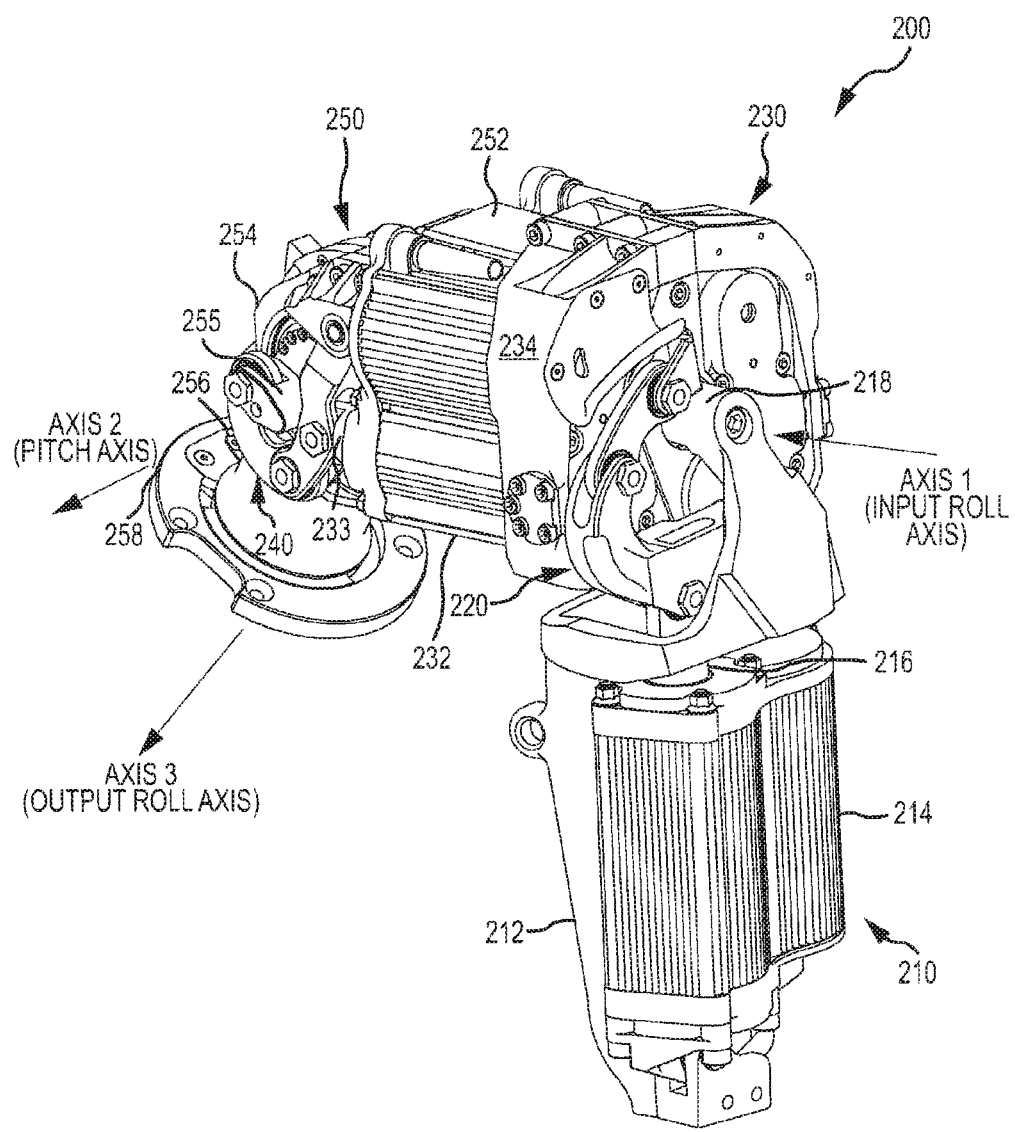
FIGS. 2A-2H illustrate one embodiment of a 3-axis robotic joint, as may be used for a shoulder joint, illustrating the joints use of an input roll assembly and a pitch-output roll assembly to selectively rotate about three axes and provide selective positioning and movement of an output shaft and mounting plate.
Figure 2B:
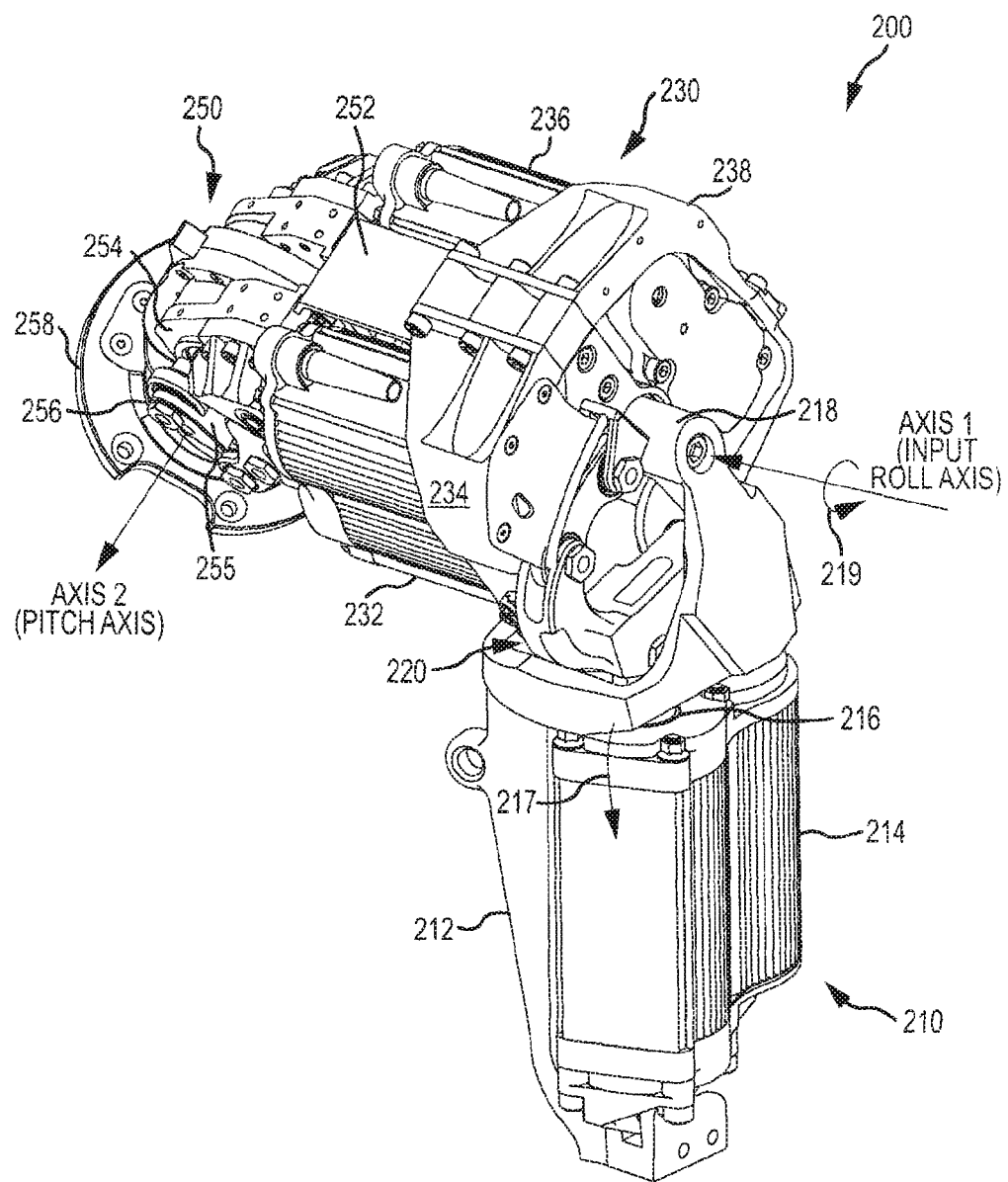
Figure 2C:
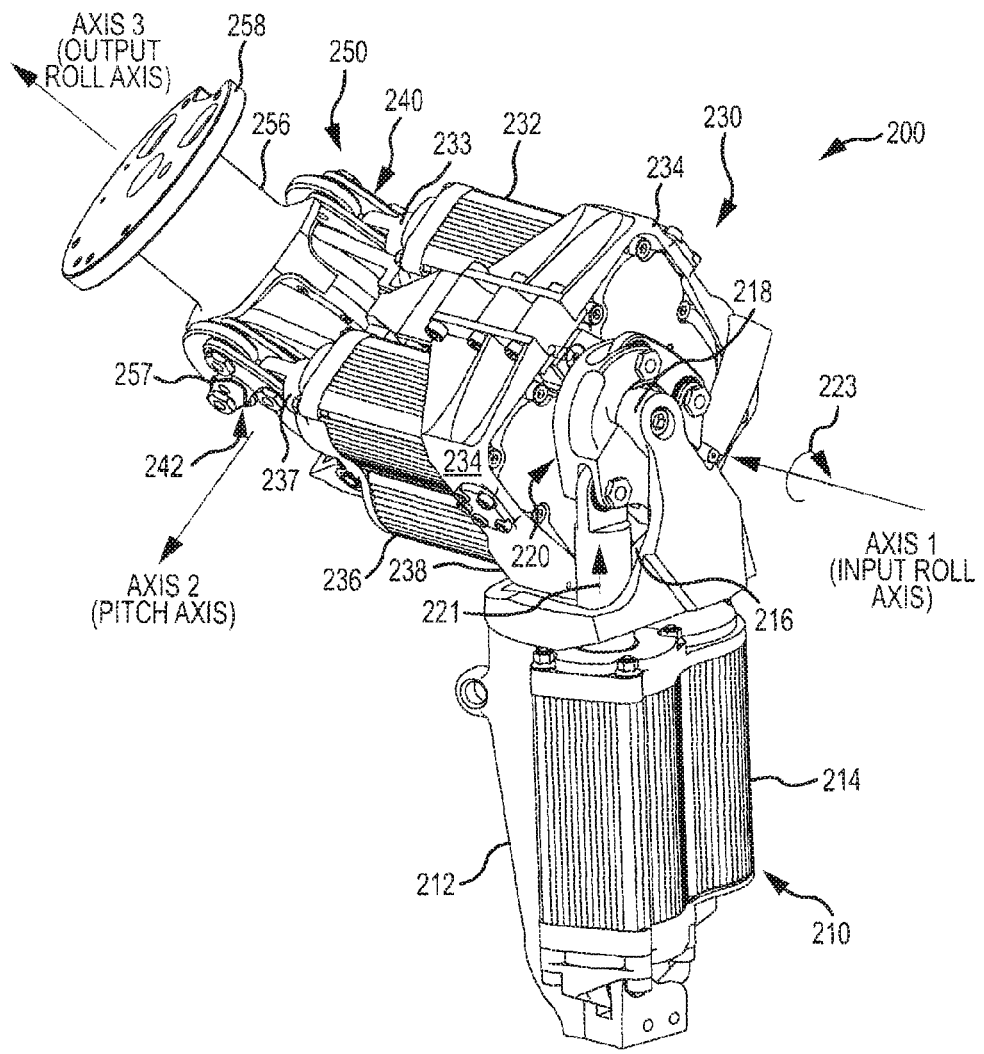

FIGS. 2A-2C illustrate the rotation of the joint 200 about Axis 1 or the input roll axis. FIG. 2A illustrates a first or starting position of the joint 200. In FIG. 2B, the linear actuator 214 is operated to cause the actuator arm 216 to be retracted into the actuator housing or shortened in its exposed length as shown with directional arrow 217. This causes the connected four-bar linkage 220 to rotate counterclockwise about input roll axle 218, which causes the differential input housing 252 (and assembly 230) to also rotate about Axis 1 (input roll axis) as shown with directional rotation arrow 219 (which shows rotation in the negative direction using the right-hand-rule). In contrast, in FIG. 2C, the linear actuator 214 is operated to cause the actuator arm 216 to be extended from the actuator housing or lengthened in its exposed length as shown with directional arrow 221. Such movement of the actuator arm 216 causes the connected four-bar linkage 220 to rotate clockwise about the input roll axle 218, which, in turn, causes the differential input housing 252 (and assembly 230) to rotate about Axis 1 (input roll axis) as shown with directional rotation arrow 223 (or rotation in the positive direction using the right-hand-rule).

The range of movement of the assembly 230 about the input roll axis (Axis 1) may be varied to practice the joint 200. In some embodiments, FIG. 2B illustrates the actuator arm 216 fully retracted while FIG. 2C illustrates the actuator arm 216 fully extended such that these two figures show a full range of the pitch-output roll assembly 230 about the input roll axis (Axis 1). For example, angular rotation may have a range of movement of about 180 degrees while other embodiments allow rotation 219, 223 (negative and positive rotation) over a range of about 270 degrees (while others provide an even greater range of rotation about Axis 1). The axle 218 extends through the four-bar linkage 220 such that the linkage 220 effectively at least partially wraps or extends around the axle 218 and Axis 1 (input roll axis) as shown in FIG. 2C. This allows a compact design for the joint, and this arrangement is supported by having at least one of the links in the 4-bar linkage being curved or arcuate in shape (e.g., two curved links are shown in linkage 220 such that each may avoid contact with the axle 218 and effectively wrap about its circumference during rotation 223 as the arm 216 is extended outward).

The pitch-output roll assembly 230 includes the differential assembly 250 that includes a differential input housing 252 and a differential housing 254. An output shaft or arm 256 extends outward from the differential housing 254 and includes a mounting plate 258 to which additional robotic components may be mounted (such as an elbow, a forearm, a wrist, and so on in human-form robot implementations). In (or on) the differential input housing 252, a first or left linear actuator 232 is mounted via left actuator pivot bracket 234 while a second or right linear actuator 236 is mounted via right actuator pivot bracket 238. Each actuator 232, 236 includes an actuator arm 233, 237 that extends outward from its actuator housing and is pivotally connected to first or left differential four-bar linkage 240 and second or right differential four-bar linkage 242. The differential four-bar linkages 240, 242 are, in turn, connected to a pair of differential side gears (not shown in FIGS. 2A-2H) via linkage-side gear connectors 255, 257 such that selective operation of the linear actuators 232, 236 drives the linkages 240, 242 via actuator arms 233, 237 to rotate the differential side gears. As explained below, such input can be used to provide rotation about both (or one of) the pitch axis (Axis 2) and the output roll axis (Axis 3).

Figure 2D:
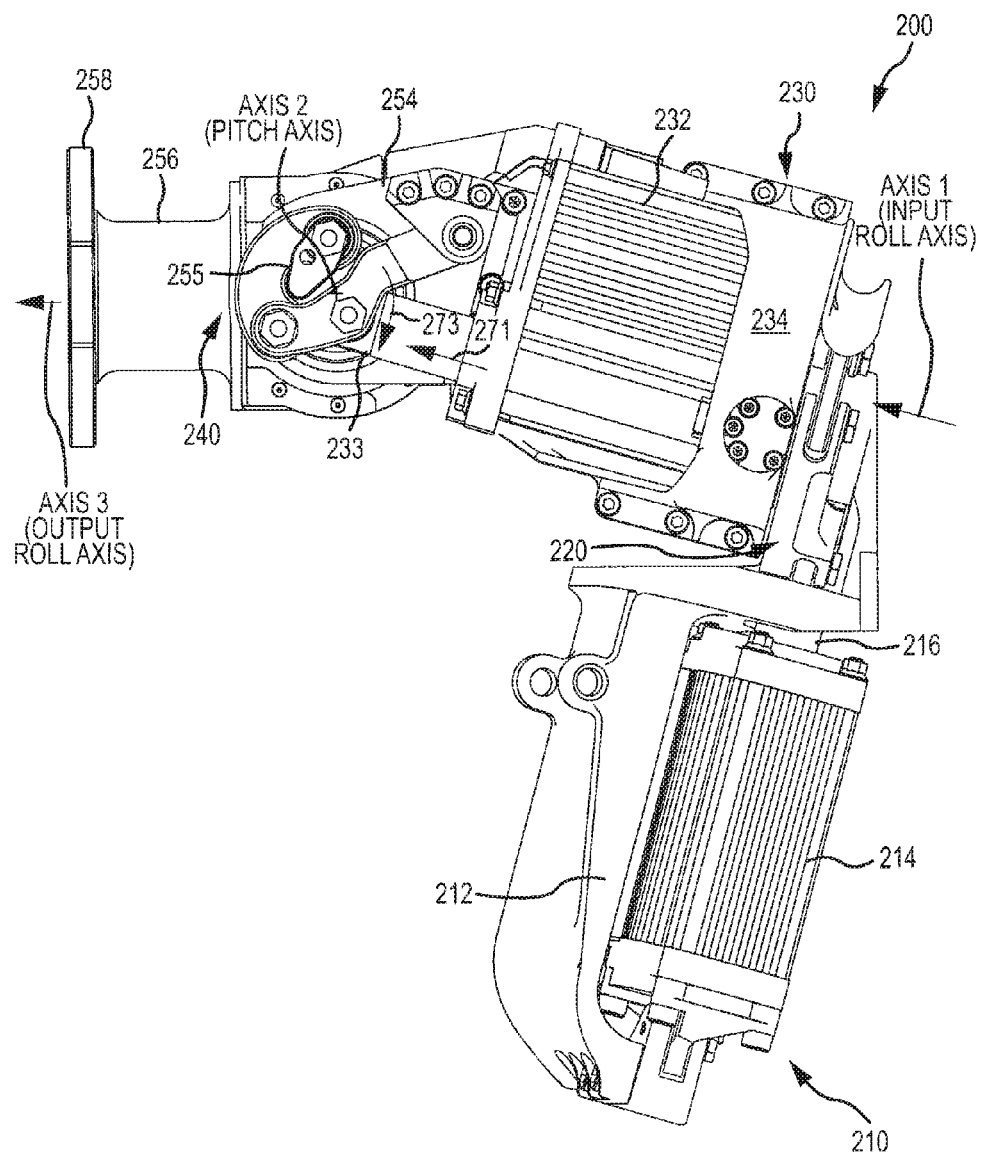
Figure 2E:
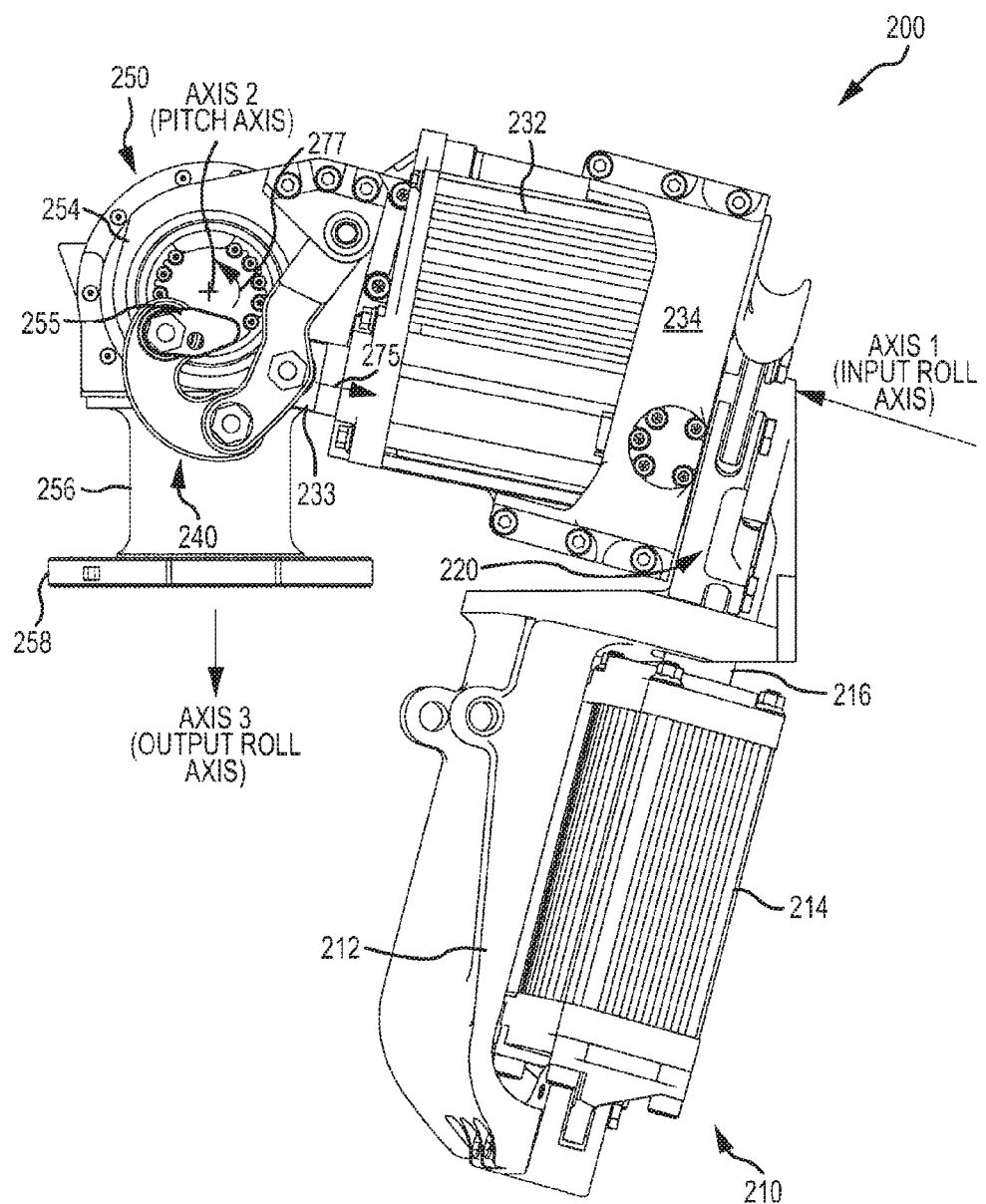

The movement of the joint 200 about the pitch axis (Axis 2) is shown by reference to FIGS. 2A, 2D, and 2E. Again, the pitch movement of the shoulder joint 200 results in the output shaft or arm 256 and mounting plate 258 being moved or pitched relative to the differential input housing 252. To this end, the selective movement of the linear actuators 232, 236 to move 4-bar linkages 240, 242 drives the differential side gears and causes the pitch about Axis 2. FIG. 2A illustrates the output shaft or arm 256 with attached plate 258 in a first location, and FIG. 2D illustrates the output shaft or arm 256 being pitched upward. To this end, the actuator 232 operates to extend the actuator arm 233 outward from actuator body as shown with directional arrow 271, which causes the linkage 240 to pivot the linkage-side gear connector 255 (and rigidly interconnected side gear of differential) to cause the differential mechanism to pitch or rotate clockwise as shown with arrow 273 the output shaft 256 and plate 258 to a second location. Then, in FIG. 2E, the joint 200 is shown with the output shaft 256 and plate 258 rotated to a third location by retracting (as shown with directional arrow 275) the actuator arm 233 by operation of the linear actuator 232. This causes the four-bar linkage 240 to drive the side gear of the differential via the linkage-side gear connector 255. The range of motion achievable may vary such as up to about 120 degrees rotation between positions 2 and 3 of FIGS. 2D and 2E (which may be considered the two end points of pitch motion with the actuator arm(s) fully extended and fully retracted), with other embodiments providing closer to about 90 degrees of rotation about the pitch axis (Axis 2). During operations, of course, both actuators 232, 236 would be moved simultaneously to achieve motion, with one being discussed for ease of explanation.

Figure 2F:
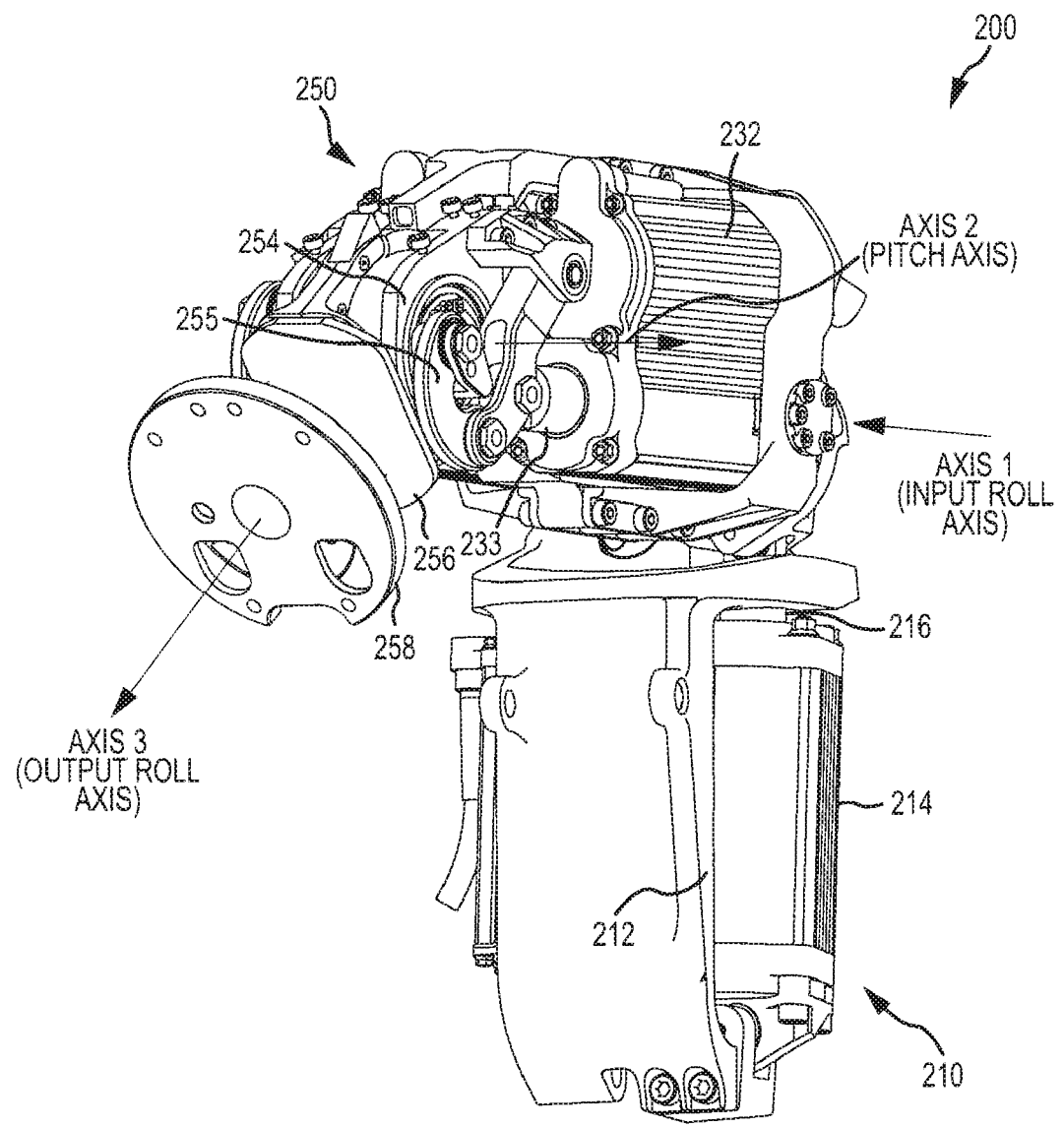
Figure 2G:
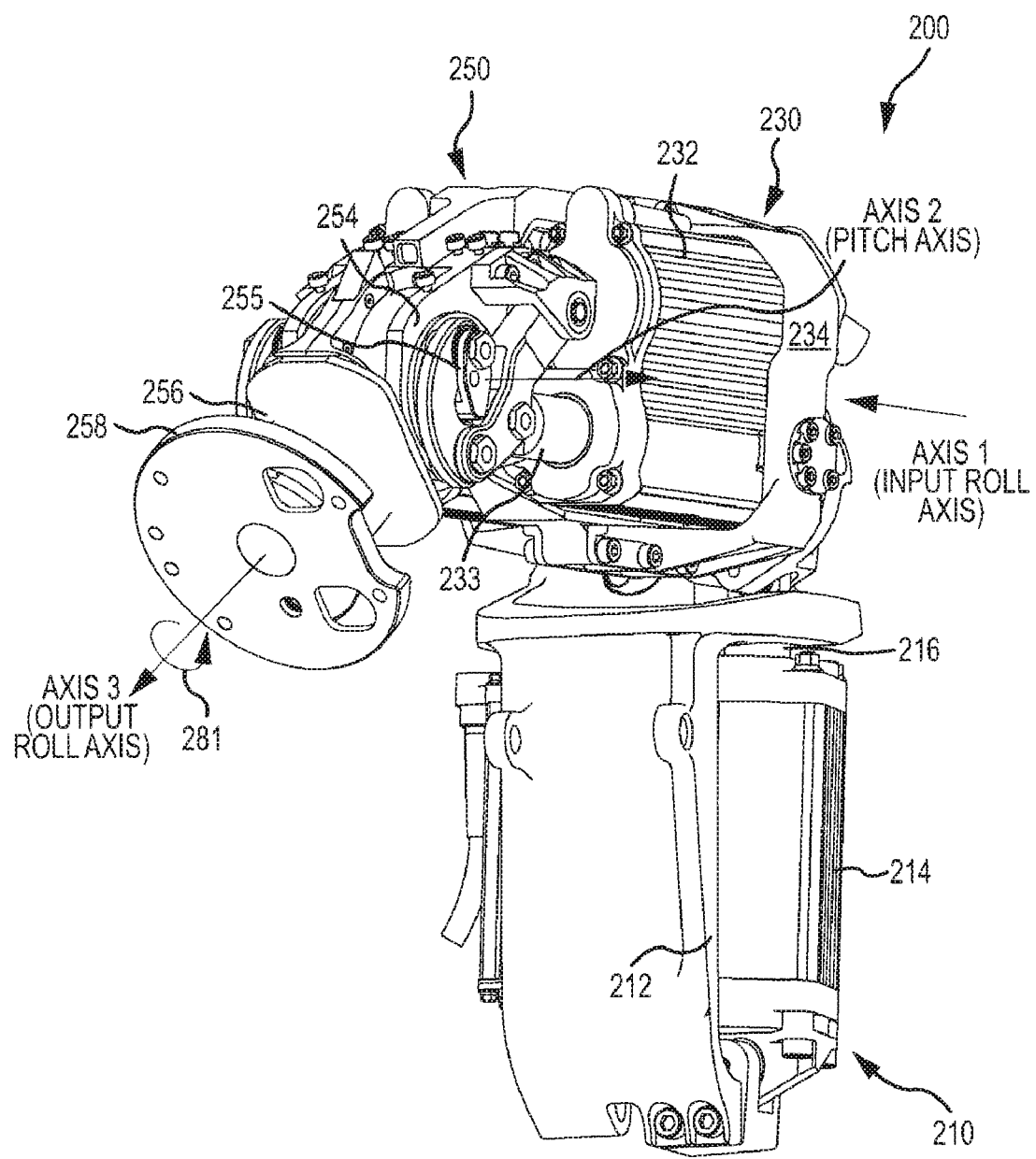
Figure 2H:
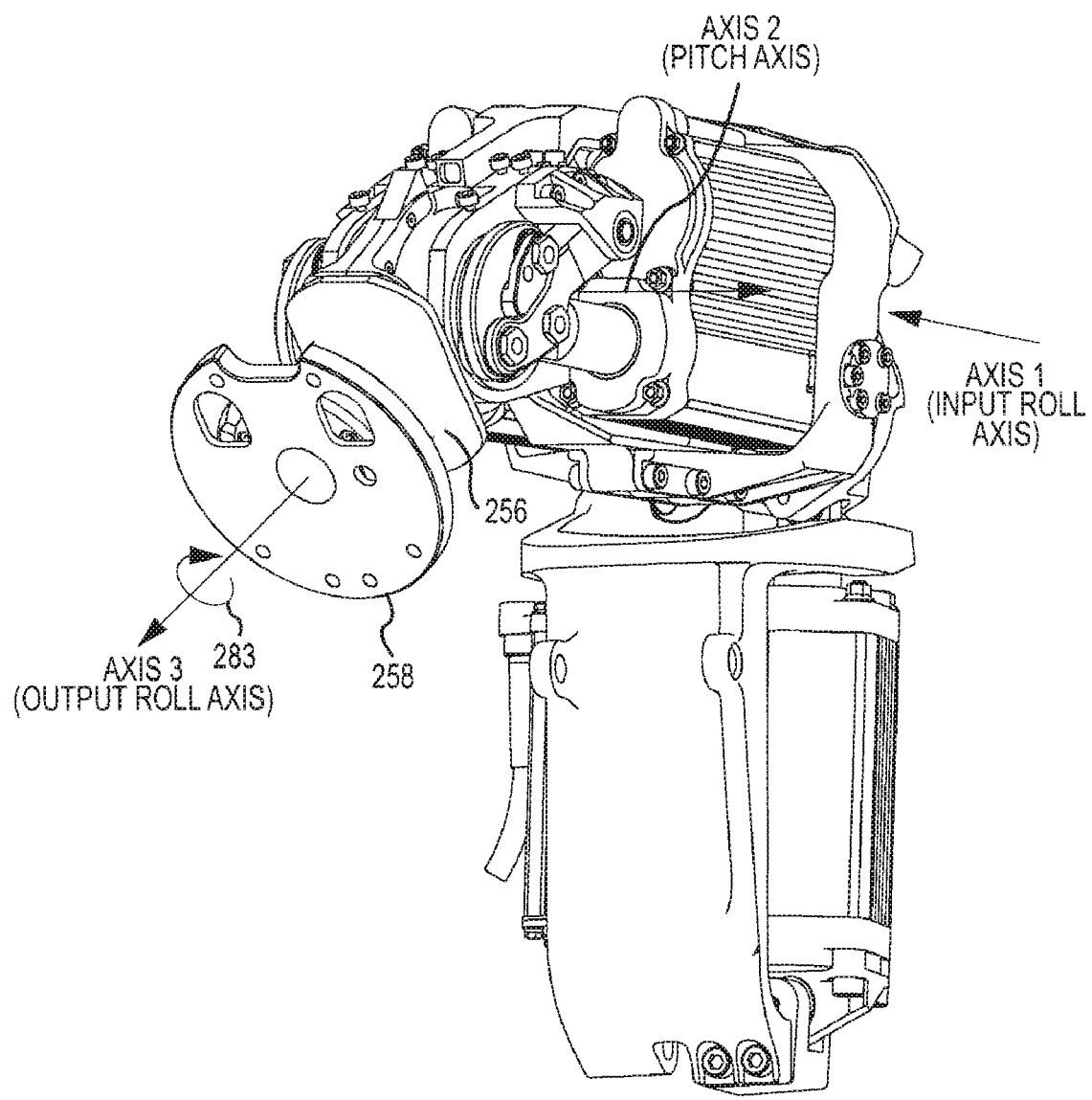

Independent of or concurrent with the pitch movement, the linear actuators 232, 236 may be operated to provide output of the output arm or shaft 256 via rotation of mounting plate 258 (or part 552 in FIG. 5) about the output roll axis (Axis 3) with the output arm/shaft 256 holding bearings supporting rotation of plate 258. As explained below, this is achieved by the combined positioning of the actuator arms 233, 237, and, hence, their extension and retraction to achieve output roll is not discussed in detail here. However, rotation about the output roll axis (Axis 3) is shown by reference to FIGS. 2F-2H. FIG. 2F shows the output arm/shaft 256 and mounting plate 258 in a first output position while FIG. 2G shows the plate 258 in a second output position. Between the first and second positions, the linear actuators 232, 236 have been operated to cause the output roll about Axis 3 (output roll axis) as shown with the arrow 281 showing positive (by the right-hand-rule) rotation (e.g., up to about 90 degrees of rotation from the position shown in FIG. 2F). FIG. 2H shows the output arm 256 and plate 258 in a third output position. Between the first and third positions, the linear actuators 232, 236 have been operated to cause the output roll about Axis 3 (output roll axis) as shown with arrow 283 indicating a negative (by the right-hand-rule) rotation (e.g., about 180 degrees from the position shown in FIG. 2F or about 180 degrees output roll movement relative to Axis 3 (the output roll axis) in this embodiment).

Figure 3:
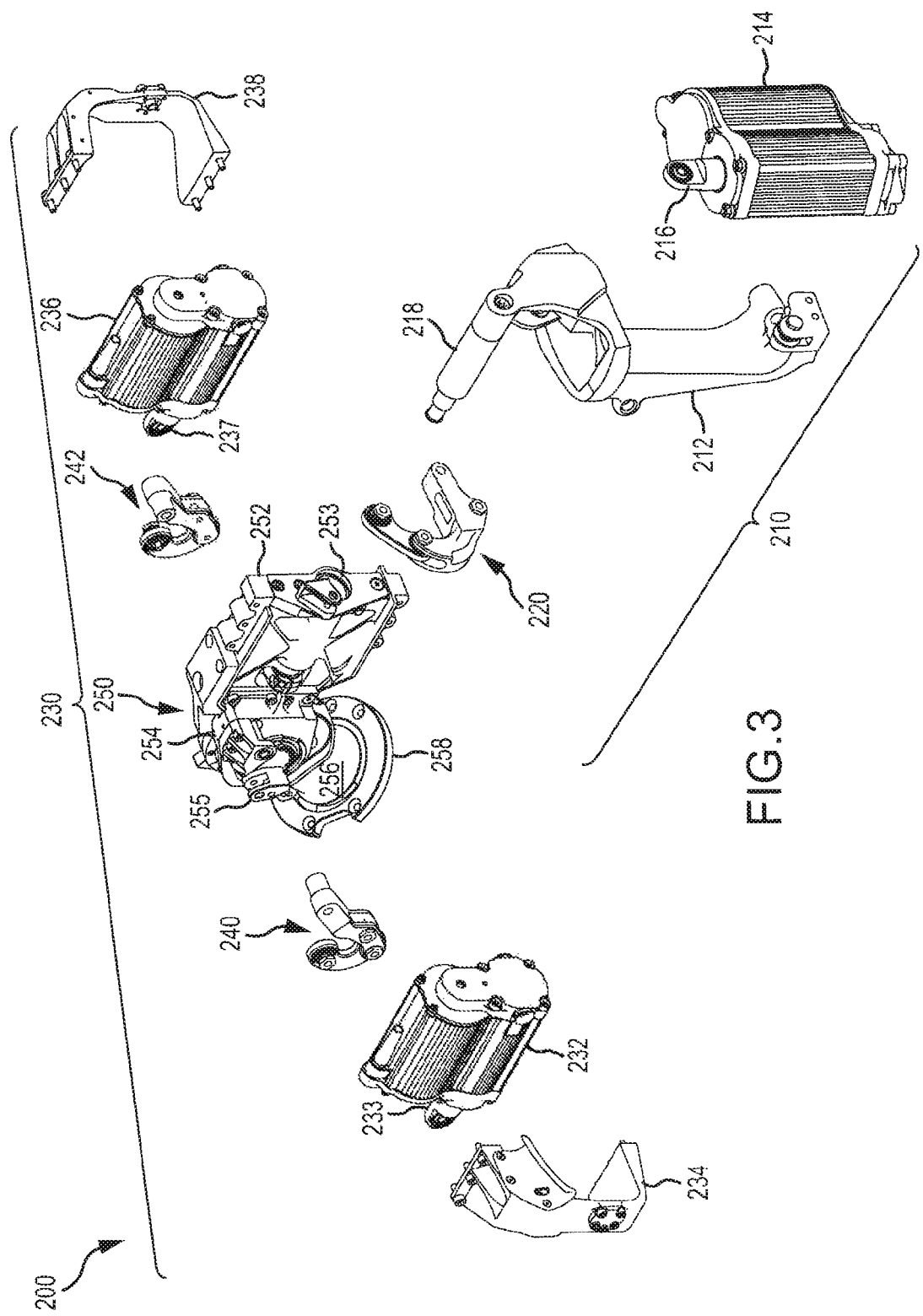
FIG. 3 is an exploded perspective view of a 3-axis robotic joint according to one embodiment of the invention showing components of the input roll assembly and the pitch-output roll assembly.

To assist in the understanding of the joint 200, FIG. 3 illustrates an exploded view of the joint 200 showing several of the major subassemblies/components of the joint 200. The joint 200 includes an input roll assembly 210 and a pitch-output roll assembly 230. The input roll assembly 210 includes an input roll actuator 214 that may take the form of an electric linear actuator driving an actuator arm 216 along a linear path some preset distance (from full retraction to full extension). The input roll actuator 214 is mounted onto a scapula support bracket 212 that may, in turn, be supported upon other portions (not shown) of a robot assembly/system. For example, the support bracket 212 may be mounted to a moving portion of an animatronic figure (e.g., if the joint 200 were used as a shoulder, the bracket 212 may be mounted to some portion of a torso) or may be mounted to provide a fixed ground reference.

The input roll assembly 210 further includes an input roll 4-bar linkage 220 and a input roll axle or pin 218 that extends from the bracket 212 through the linkage 220 into a receiving channel or well 253 in the differential input housing 252 (which has a bearing surface such that the housing 252 may rotate on the axle 218 while being supported by the bracket 212). The linkage 220 is pivotally connected to the differential input housing 252 such that when it is driven by movement of the actuator arm 216 it rotates the housing 252 on the axle 218.

The pitch-output roll assembly 230 includes a differential assembly 250 that includes a differential input housing 252 with channel 253 for linking to the input roll 4-bar linkage 220 and the input roll axle 218 (which defines or coincides with Axis 1 in this case). On or in the differential input housing 252, a left actuator 232 with an actuator arm 233 and a right actuator 236 with an actuator arm 237 are mounted via left actuator pivot bracket 234 and right actuator pivot bracket 238. The differential assembly 250 also includes a differential output housing 254 that houses the differential itself (not shown in FIG. 3), and a pair of linkage-side gear connectors 255, 257 are provided to allow the side gears to be driven by actuators 232, 236 via movement of the actuator arms 233, 237. Specifically, left and right differential 4-bar linkages 240, 242 are pivotally attached to the differential output housing 254 and to the connectors 255, 257 as well as to the actuator arms 233, 237. The differential assembly 250 also includes an output shaft/arm 256 linked to the output of the differential mechanism and a mounting plate 258 is rotatably mounted to an end of the arm 256, and during operation of the actuators 232, 236 and differential mechanism within the housing 254, it is the shaft/arm 256 and plate 258 (and anything attached to such plate 258) that are rotated about the pitch and output roll axes (Axis 2 and Axis 3, respectively).

The pitch axis (Axis 2) and the output roll axis (Axis 3) are operated by the linear actuators 232, 236 driving the 4-bar linkages 240, 242 to drive or rotate side gears of the differential mechanism positioned within the housing 254 (or part of differential assembly 250). Such differential mechanisms may take numerous forms to practice the joint with a key aspect being that they include two side gears that are linked to a 4-bar linkage to be driven by such linkage. However, at this point, it may be useful to generally describe a differential mechanism that may be used in the differential assembly 250 to provide pitch and output roll about Axes 2 and 3.

Figure 4:
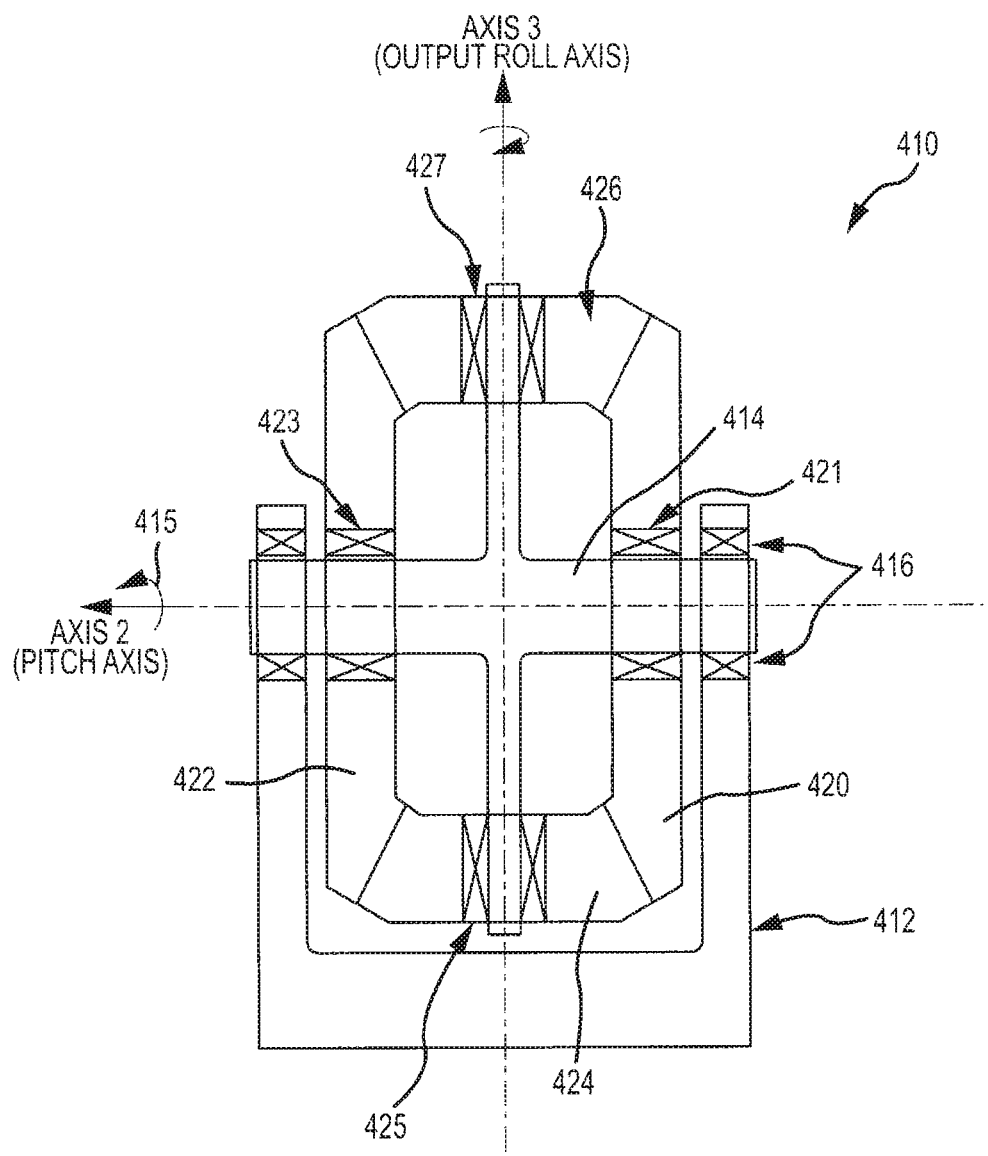
FIG. 4 is a schematic, sectional view of a differential mechanism that may be used in a joint of the present invention to provide pitch and output roll when its side gears are driven by 4-bar linkages.

For example, FIG. 4 illustrates a differential mechanism 410 that may be used in the differential assembly 250 of the joint 200 of FIGS. 2A-2G. As shown, the differential mechanism or geared differential 410 includes a clevis support structure 412 that supports the components of the geared differential. A cross or "spider" 414 is provided as shown by the two intersecting round shafts, and the cross/spider 414 is rotatably mounted via bearings 416 within the clevis 412 such that the cross/spider 414 may rotate about Axis 2 (the pitch axis of a robotic joint such as joint 200) as shown with arrow 415. Four meshing bevel gears 420, 422, 424, and 426 are mounted rotatably relative to this cross 414 via bearings 421, 423, 425, and 427. Gears 420 and 422 are input gears (or, as commonly known, "side gears") for the differential 410 that are controlled or driven by using linear actuators (e.g., via 4-bar linkages via a side gear-linkage connector attached to both the linkage and side/input gears 420, 422).

The gear 424 is an idler gear that may transfer loads from gears 420, 422 to the cross or spider 414 or to each other. Gear 426 is the output gear for the differential mechanism 410 that may be connected to an output shaft/arm (such as shaft/plate 258 in joint 200) or other output of the mechanism 410 and Axis 3 (output roll axis) passes through the center of the output gear 426. In operation, when gears 420, 422 are rotated in the same direction at the same velocity, the cross or spider 414 is rotated about Axis 2 (or pitched about the pitch axis of the joint), and, hence, connection of the cross/spider 414 to the output of the joint (or a component connected to the output of the joint) causes this portion of the joint to have a pitch motion as shown in FIGS. 2D and 2E (for example). In such operation, output gear 426 does not rotate about Axis 3 (no movement about the output roll axis). In contrast, when gears 420, 422 are rotated in opposite directions at the same velocity, the cross/spider 414 remains stationary while the output gear 426 is rotated about Axis 3 (e.g., in such an operating mode, there is no pitch while there is roll about the output roll axis).

More generally, the rotation of output gear 426 is according to the following equations: $q2\_dot=(v1+v2)/2$ and $q3\_dot=R(v1-v2)/2$ when the ratio of pitch diameters of gear 420 to output gear 426 is R, the rotational velocities of output gear 426 about Axes 2 and 3 is denoted by $q2\_dot$ and $q3\_dot$, respectively, and the rotational velocities of gears 420, and 422 are denoted by v1 and v2, respectively.

Figure 5:
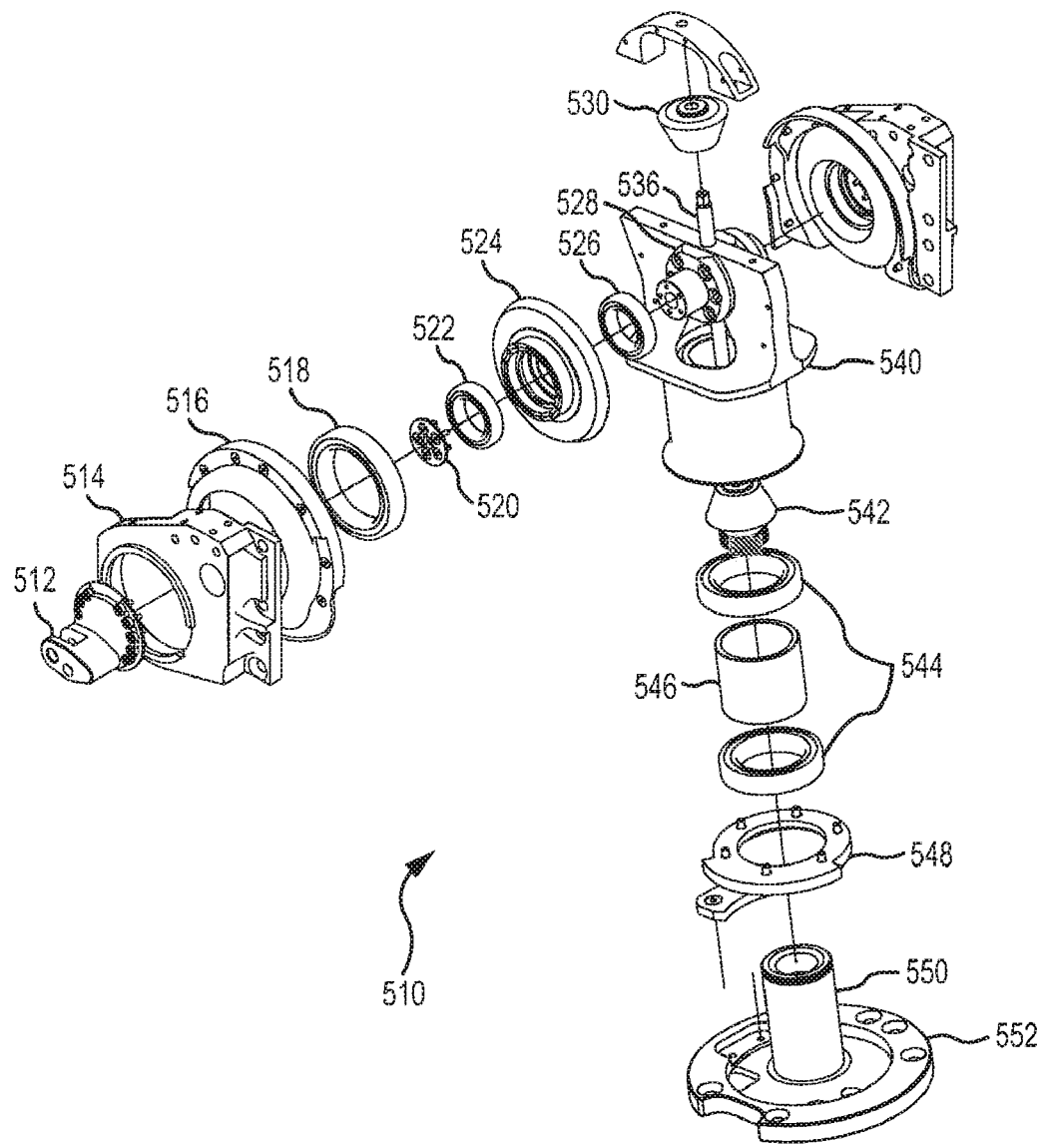
FIG. 5 is an exploded view of an exemplary differential mechanism such as may be used in the differential assembly of FIGS. 2A-2G.

FIG. 5 illustrates an exploded view of one embodiment of a geared differential mechanism 510 that implements the functionality of mechanism 410 shown in FIG. 4 and that may be used in the differential assembly 250 of joint 200 (for example). For simplicity's sake, one side is not exploded as it is a mirror image of the exploded side, and, also, it should be understood that gear teeth are not shown but would be provided in conventional form(s) on the mating gear surfaces. As shown, the mechanism 510 includes a four-bar linkage attachment 512 that extends outward from two sides of the mechanism 510 to allow left and right 4-bar linkages to be connected to the mechanism and drive the input/side gears (e.g., gear 524 is connected to the attachment or connector 512). A shoulder differential attachment bracket 514 (both right and left sides) forms a side of a structural clevis (such as clevis 412 of mechanism 410 in FIG. 4) that supports the differential.

Figure 6:
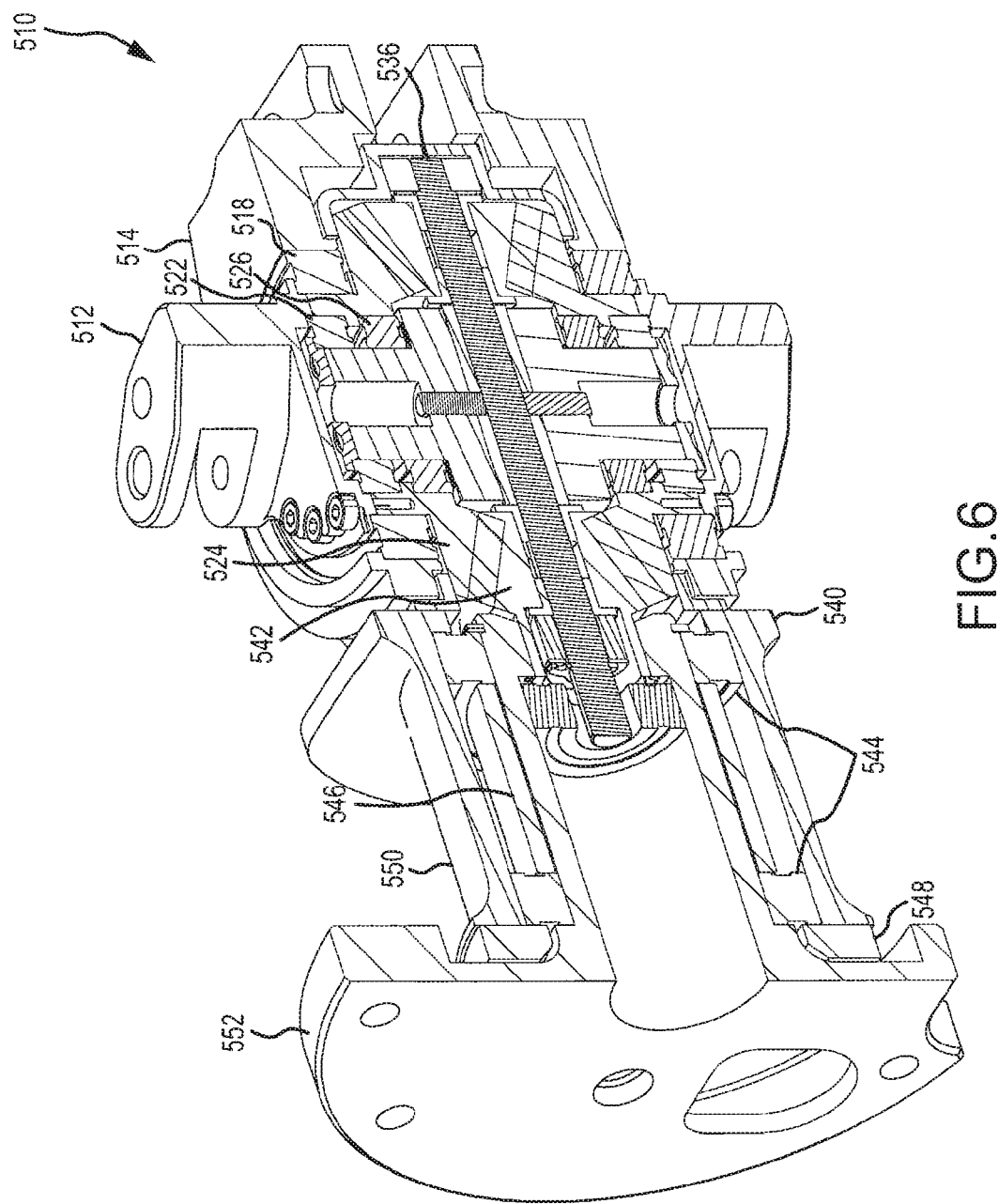
FIG. 6 is an assembled view of the differential mechanism of FIG. 5.

The differential mechanism 510 further includes a gear cover 516 for the input/side gear 524, a differential support bearing 518, a bearing retention plate 520, and input gear bearings 522, 526. The input/side gear 524 rotates on bearings 522, 526 while the shoulder differential attachment bracket 514 supports bearing 518. The spider or cross of the differential mechanism 510 is provided or formed with the differential spider housing 540, input gear shaft 528, and output gear shaft 536. The spider/cross supports the shown input/side gear 524 (as well as the other/opposite side gear) to rotate on shaft 528 via input gear bearings 522, 526. The differential mechanism 510 further includes output idler gear 530 that is supported on the cross/spider on output gear shaft 536. On the opposite side of shaft 536, the output gear 542 is rotatably mounted in the mechanism 510. The output gear 542 is coupled via a splined connection with output shaft/arm 550 and affixed upper arm attachment/mounting plate 552. Upper arm support bearings 544, spacer 546, and upper arm retention plate 548 complete this output portion of the differential mechanism 510, e.g., provide rotatable mounting of the upper arm attachment 552 to the differential spider/cross. FIG. 6 illustrates a sectional view of the differential mechanism 510 upon assembly.

In one implementation or embodiment of a differential mechanism for a robotic joint, the side gears each have 34 teeth while the idler gears have 14 teeth to create a differential ratio of R=34/14, but, of course, other differential ratios may be utilized to practice a robotic joint. The gears of the differential mechanism may all have straight tooth bevel gears, which may be made from 4340 steel with a nitride surface treatment or otherwise be formed of materials with proper surface treatments to provide desired service lives. For example, some applications may be made from other materials such as different types of steel, aluminum, plastics, and/or ceramics with or without coatings/treatments such as anodizing, titanium nitride, PTFE (Teflon), or the like. The gears may even, in some cases, be made from smooth cones that transmit torque through frictional contact. The differential mechanism may even be a cable differential such as shown in U.S. Pat. No. 5,207,114, which is incorporated herein by reference in its entirety.

In order to control the rotation angle of each of the differential side or input gears using a linear actuator, a four-bar linkage is used in the joints described herein (e.g., via a connection of a 4-bar linkage to side gear via the four-bar linkage attachment/connector 512 and also to an actuator arm of a linear actuator, as discussed with reference to FIGS. 2A-2G). One purpose of the four-bar linkage is to provide a mechanical amplification between the motion of the actuator and the rotation of the related side gear. The four-bar linkage allows the actuator to rotate the side gear through a large range of motion (e.g., a range of motion between 120 and 180 degrees such as about 154 degrees in one implementation of a robotic joint) with minimal change in mechanical advantage (e.g., a ratio of about 1 to 1.5 such as about 1.15 in one case between maximum and minimum mechanical advantage). This allows sufficient range of rotation of the side gears to provide both pitch (i.e., rotation about Axis 2) and output roll (i.e., rotation about Axis 3). While differing amounts of roll and pitch motion may be generated, one robotic joint implemented by the inventor had about 90 degrees of pitch motion and about 180 degrees of roll motion through the majority of the range of pitch motion.

Figure 7:
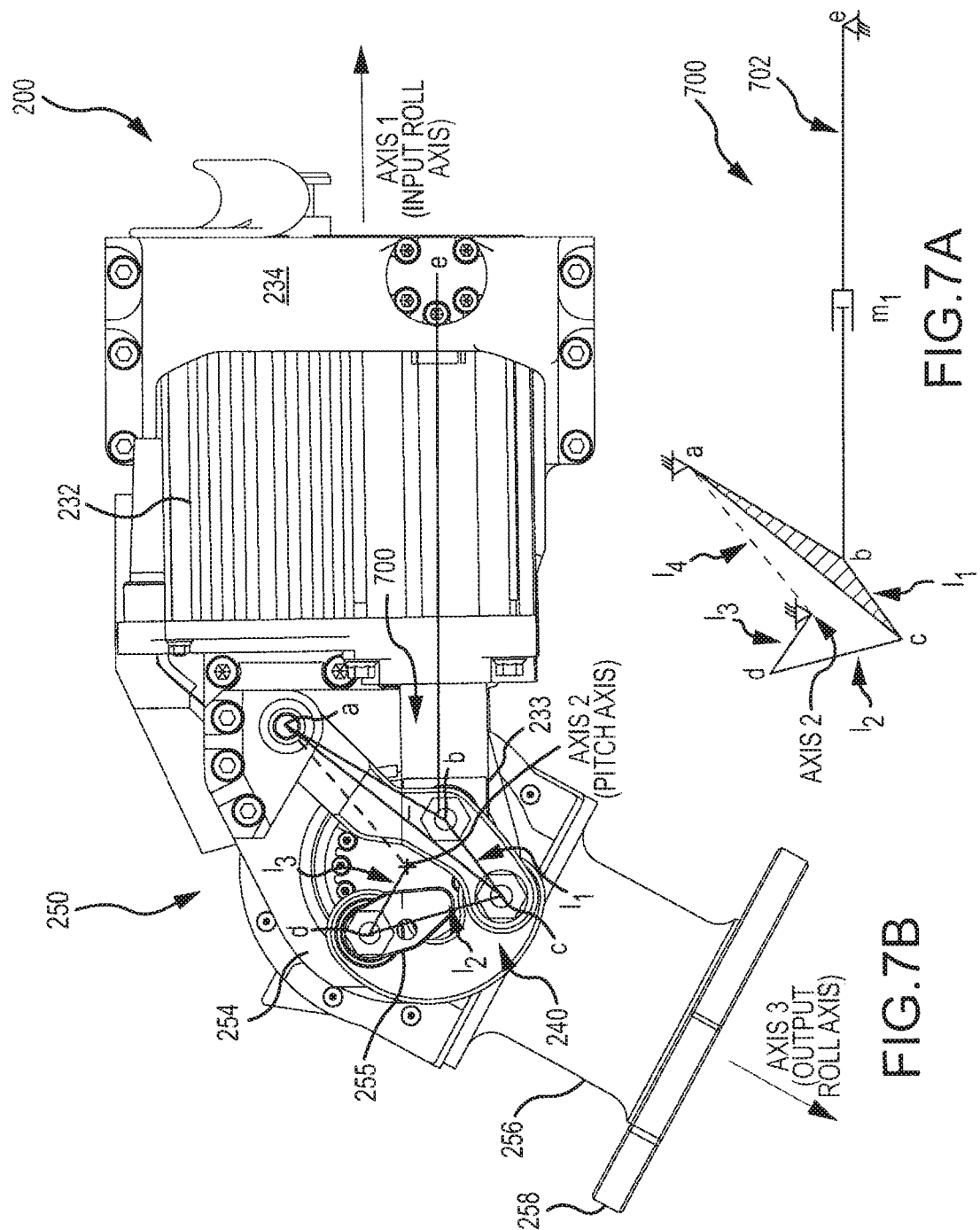
FIGS. 7A and 7B illustrate a schematic of a four-bar linkage useful for driving a side or input gear of a geared differential and a joint such as that shown in FIGS. 2A-2G with an overlay of the 4-bar linkage schematic showing corresponding components/portions of the joint and the 4-bar linkage.

FIG. 7A illustrates a schematic diagram 700 of a four-bar linkage that may be used to drive one differential side gear of a robotic joint (or of a geared differential mechanism in such a robotic joint). FIG. 7B illustrates the robotic joint 200 of FIG. 2 including an overlay image of the four-bar linkage schematic diagram 700 showing which components provide portions of the four-bar linkage. As shown, the input link, $l_1$, pivots about an axis passing through point a (or Axis a). The input link, $l_1$, is driven by linear actuator 232 via actuator arm 233 (shown as piston 702 with length, $M_1$, in schematic 700), and the linear actuator 232 pivots about Axis e (e.g., an axis passing into the paper through point e in diagram 700), which is fixed to the main support structure of the joint. The output end of the linear actuator is attached to input link, $l_1$, via a pivot at Axis b.

The output link, $l_3$, pivots about Axis 2 (the pitch axis of joint 200) that passes through differential input gears of the differential mechanism in joint 200. The output link, $l_3$, is directly bolted to one of the two differential input gears. The connecting link, $l_2$, pivots about the input link, $l_1$, on Axis c and about the output link, $l_3$, on Axis d. The ground link, $l_4$, is actually an integral part of the support structure of the joint 200. With reference to FIG. 7B, the linkage schematic 700 has been overlain on the joint 200 to show the links of the 4-bar linkage 240 and how it is used/actuated to drive a side/input gear of the differential mechanism to achieve desired motion. For example, with reference to both FIG. 7B along with FIGS. 2D and 2E, it can readily be understood how the 4-bar linkage 240 is useful for providing pitch motion as the actuator 232 (or 702) is shown partially extended and retracted, respectively. This shows the output rotation of the output link, $l_3$, and, therefore, the rotation of the corresponding differential side gear (via linkage-side gear connector 255). Note, in FIG. 2D, the links are shaped such that they nest within one another to allow a larger range of motion. The links of linkage 240 could also be made to overlap (e.g., out of the plane of the page of the figure), but this would require a greater overall joint width, which may be contrary to a goal of designing a more compact joint but may be acceptable in some cases. It may also, though, result in out-of-plane loading on shafts and bearings that may reduce load capacity.

FIGS. 2D and 2E show the extents of the range of motion of the pitch axis (Axis 2) of the joint 200. In one embodiment, the range was 90 degrees. However, in that embodiment, each four-bar linkage allows each side gear to rotate through a larger range of motion such as about 154 degrees when the range of motion of the pitch axis (Axis 2) was about 90 degrees. The remaining 64 degrees of rotation may be used to provide output roll motion of the joint 200. The joint 200 is designed in some cases to achieve 180 degrees of output roll motion about Axis 3 through the majority of its range of motion. This may be accomplished by rotating the side gears relative to each other such as by 180/R=180/(34/14) in the example provided herein, which is about 74 degrees. In other words, when one side gear rotates 37 degrees in one direction and the opposite side gear rotates by 37 degrees in the opposite direction, the joint 200 is able to achieve 180 degrees of output roll with no motion of the output shaft/mounting plate relative to the pitch axis (Axis 2).

Note, that in the illustrated and explained embodiment, at either extent of Axis 2 (pitch axis) motion, each side gear may only travel about 32 degrees (i.e., (154−90)/2 degrees) due to limitations in stroke of the particular electric linear actuators used in the joint 200. As a result, the possible roll angle is about 155 degrees (or 64*34/11 degrees) of output roll (i.e., Axis 3 rotation). If pitch (i.e., Axis 2) is moved 5 degrees away from the extent of its range of motion, then each side gear may again rotate by about 37 degrees, which allows a full 180 degrees of output roll motion about Axis 3. If the pitch axis is positioned within 5 degrees of the extent of its range of motion, then the output roll is limited to between about 155 and about 180 degrees of output roll. Larger ranges of motion of the linear actuators would, of course, allow larger ranges of motion of the pitch and output roll axes with the above ranges provided as examples (and not limitations) of results possible with robotic joints of the invention (such as joint 200).

Figure 8:
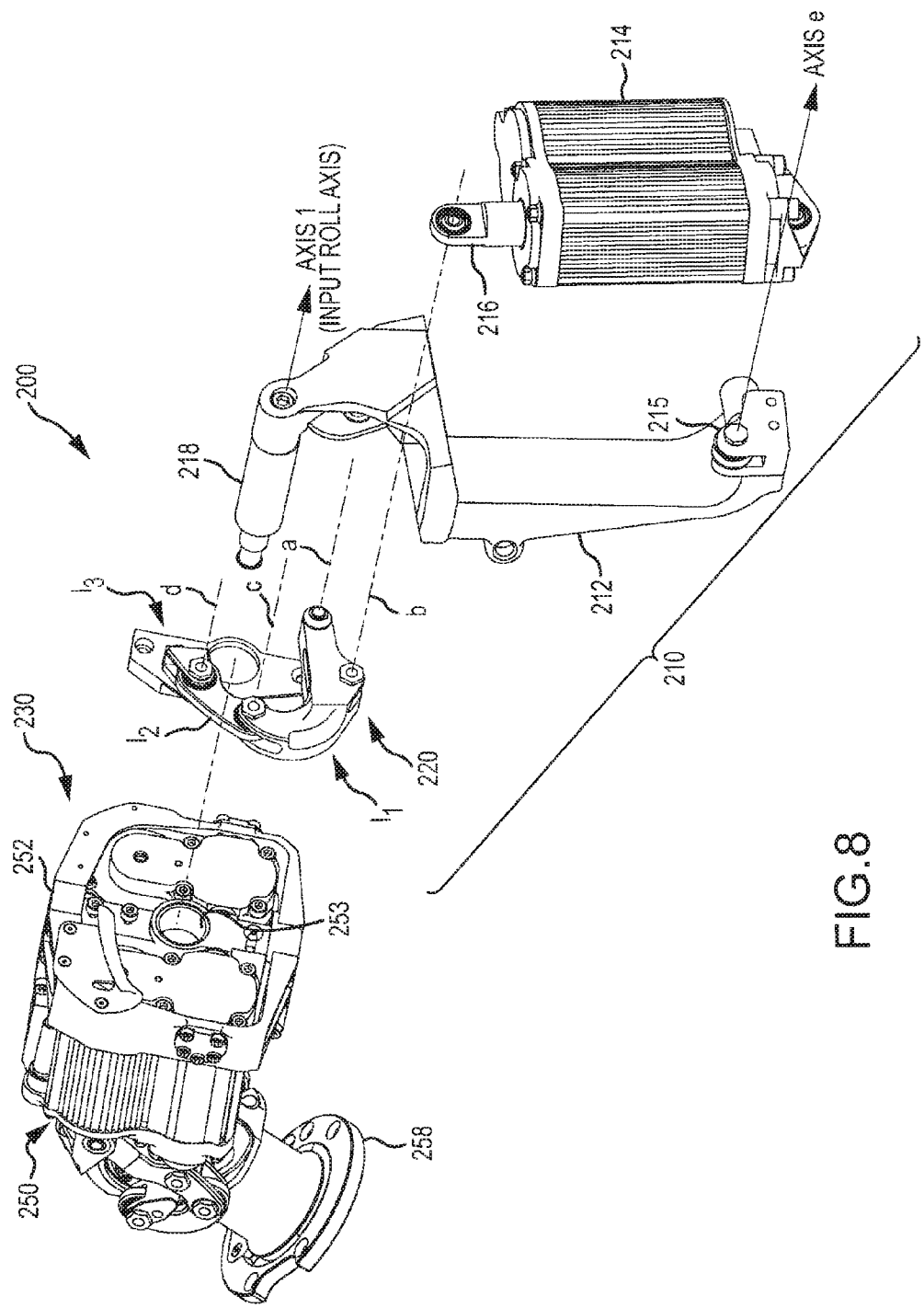
FIG. 8 illustrates a partial exploded view of the joint of FIGS. 2A-2G showing components of the input roll assembly.

The input roll axis (Axis 1) is actuated in a manner similar to the side gears of the differential. Specifically, as discussed above for the side gears, a linear actuator and a four-bar linkage are used in combination to achieve a large range of motion with a relatively small change in mechanical advantage. FIG. 8 illustrates a partial exploded view of joint 200. FIG. 8 shows the main subassemblies of input roll assembly 210 used to actuate the input roll axis (Axis 1), which passes through or coincides with the longitudinal axis of the input roll axle/pin 218 (which is inserted into well 253 of differential input housing 252). The input roll actuator 214 is mounted via a lower pivot bushing 215 on Axis e to the scapula support bracket 212, which as mentioned above is itself considered a ground reference. The components of the pitch-output roll assembly 230 constitute the pitch axis (Axis 2) and output roll axis (Axis 3). The pitch-output roll assembly 230 rotates about Axis 1 on the shaft extension 218, which is part of the scapula support bracket 212.

Figure 9B:
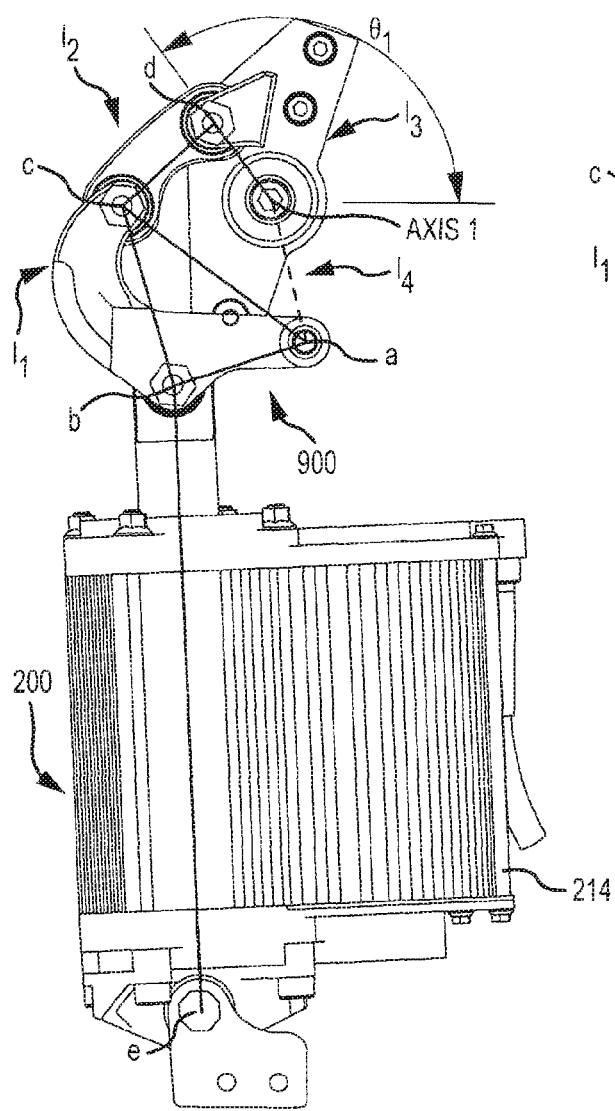
FIGS. 9A and 9B illustrate a schematic of a four-bar linkage useful for driving or providing input roll in a robotic joint.
Figure 9A:
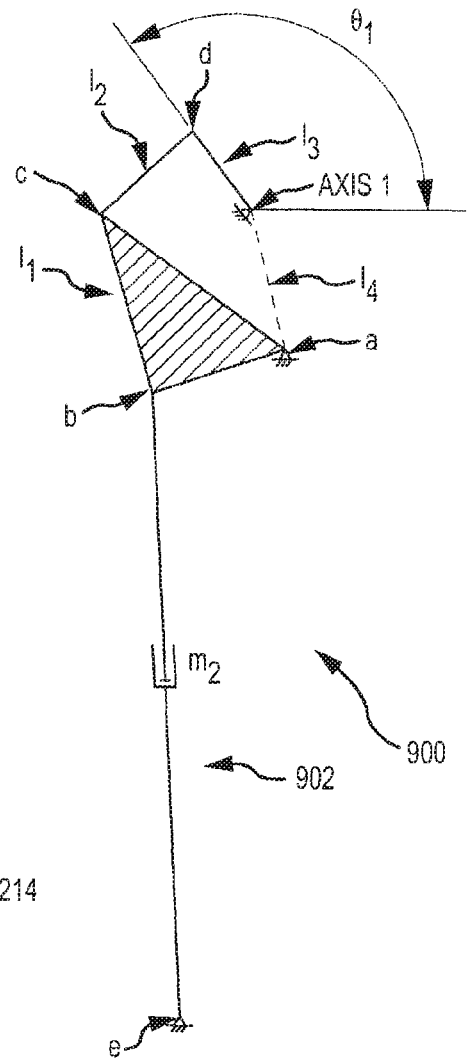

The four-bar linkage actuation of the input roll axis is described now with reference to FIGS. 9A to 10B. FIG. 9A illustrates a schematic diagram of the input four-bar linkage. The "ground" points on the diagram 900 correspond to fixed pivots on the scapula support bracket 212. The linear actuator 214 is depicted schematically in diagram 900 as a piston 902 with length, $m_2$. The links of the four-bar linkage are labeled $l_1$ through $l_4$. The input link, $l_1$, is driven by actuator 902 via a pivot at Axis b. The input link, $l_1$, pivots about a point fixed to the scapula support bracket 212 at Axis a. The output link, $l_3$, is bolted rigidly to the pitch-output roll assembly 520 and pivots about Axis 1. The angle, $\theta_1$, represents the output angle of the linkage of diagram 900. The connecting link, $l_2$, pivots about input link, $l_1$, at Axis c and output link, $l_3$, at Axis d. The ground link, $l_4$, does not move and is, in fact, a portion of the scapula support bracket 212. The base end of actuator 902 (and linear actuator 214) is fixed to ground, e.g., another pivot on the scapula support bracket 212. FIG. 9B illustrates the joint 200 with the linkage diagram 900 shown as an overlay on or near corresponding physical implementations of the linkage components.

Figure 10A:
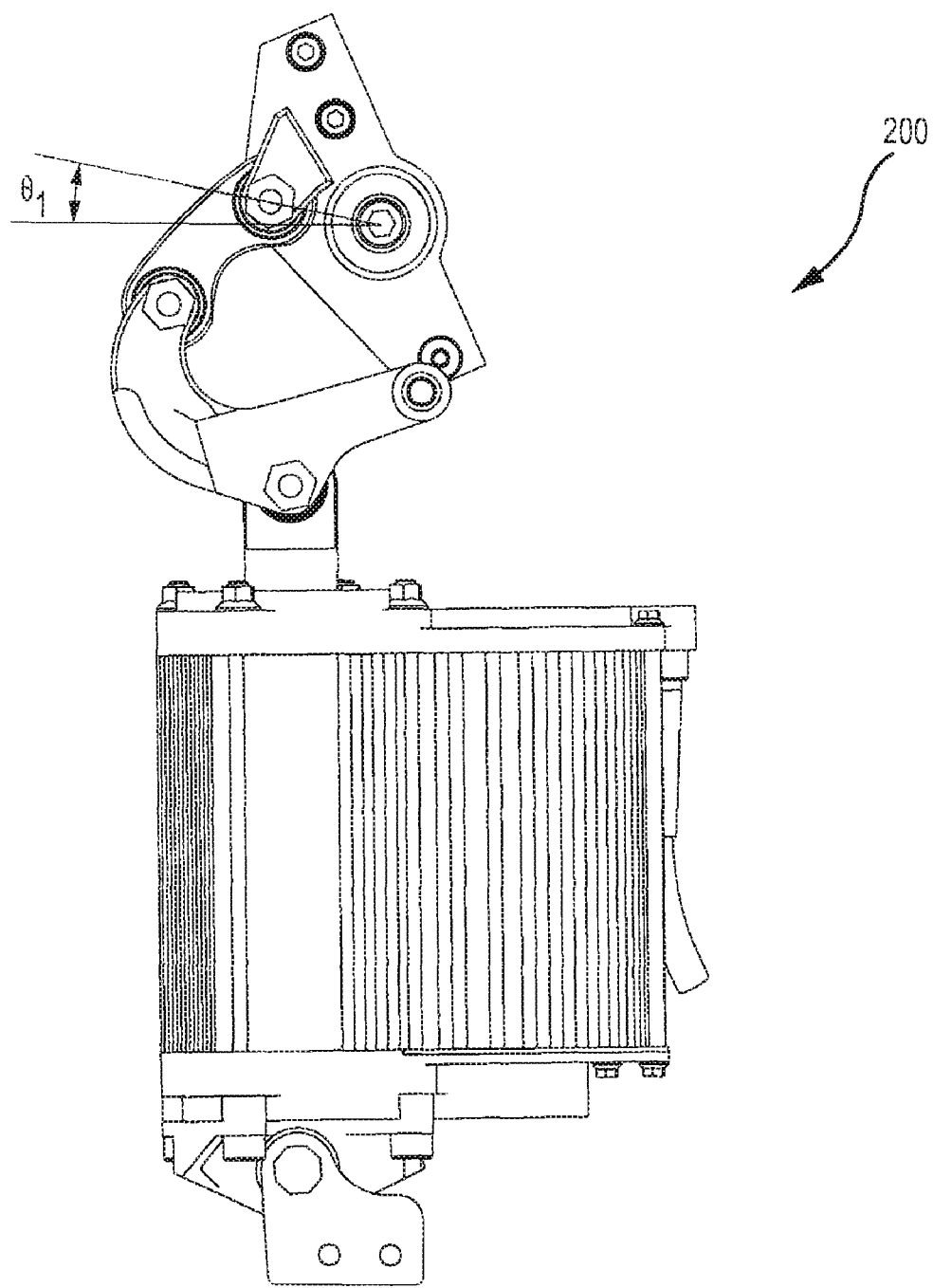
FIGS. 10A and 10B illustrate an input roll linear actuator in fully retracted and extended positions, respectively.
Figure 10B:
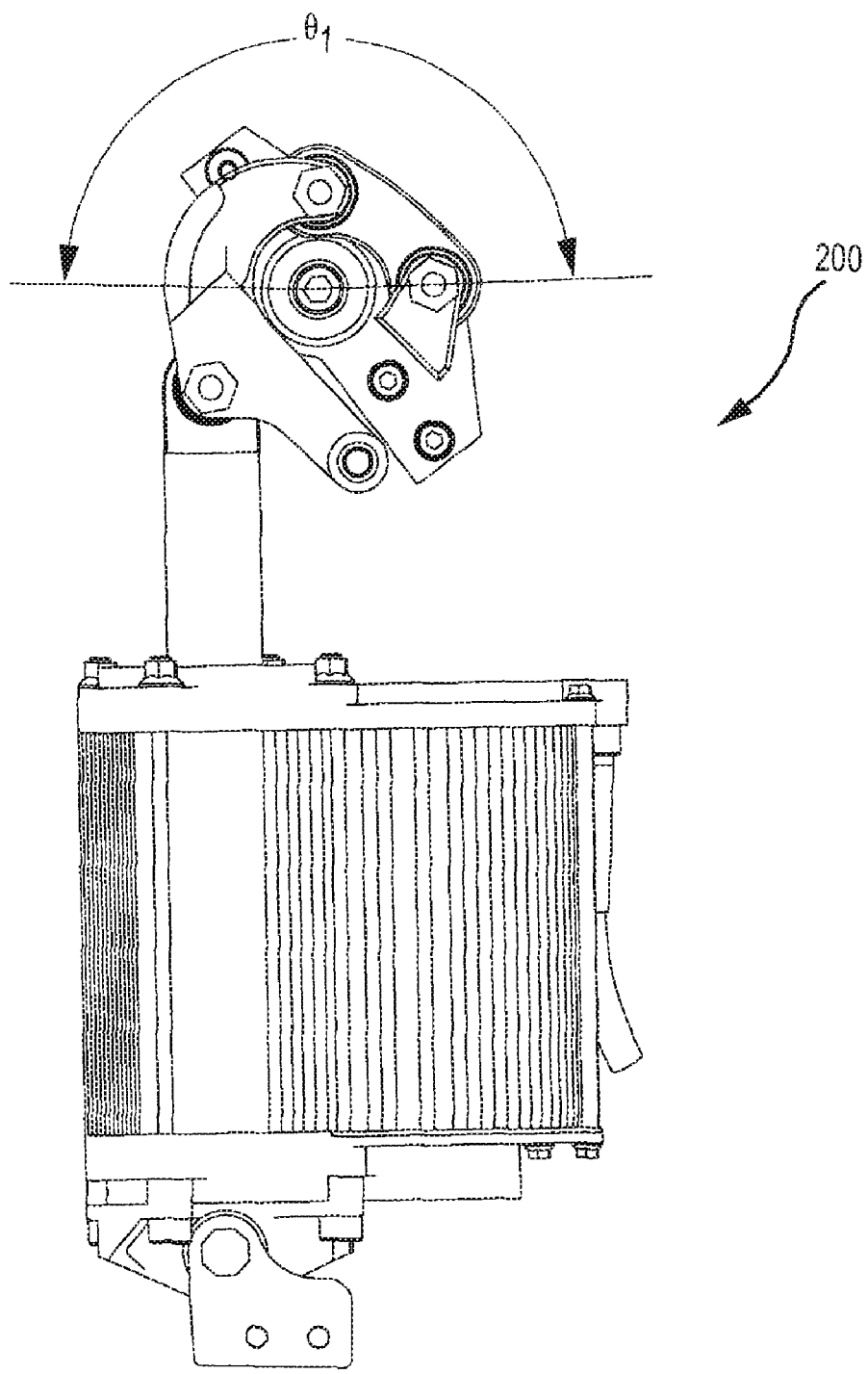

FIGS. 10A and 10B show the input roll linear actuator 214 in its fully retracted and fully extended positions, respectively. As the actuator is shortened, the output link rotates such that angle, $\theta_1$, decreases in size. Note, the links of the four-bar linkage are curved in order to accommodate this rotation without interfering with each other. These links may also be designed to overlap, but this may require a greater overall joint width, which may be contrary to a goal of providing a compact joint. Also, such an overlapping design may result in out-of-plane loading on shafts and bearings that may reduce load capacity.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:
1. A robotic joint, comprising:
   a pitch-output roll assembly including:
      a housing,
      a differential mechanism, supported by the housing, including a left input gear, a right input gear, an output gear, a cross element interconnecting the gears, and a clevis supporting the gears and the cross element within the housing,
      a left four-bar linkage coupled to the left input gear,
      a right four-bar linkage coupled to the right input gear, and
      first and second linear actuators connected to the left and right four-bar linkages, respectively, selectively driving the left and right input gears to rotate the output gear about an output roll axis and to rotate the cross element about a pitch axis passing through the cross element and the input gears.

2. The robotic joint of claim 1, further comprising an input roll assembly with an actuator mechanism, wherein the actuator mechanism of the input roll assembly operates to rotate the housing of the pitch-output roll assembly about an input roll axis extending through the differential mechanism.

3. The robotic joint of claim 1, wherein the first linear actuator comprises an electric linear actuator with an actuator arm connected to an input link of the left four-bar linkage and wherein the second linear actuator comprises an electric linear actuator with an actuator arm connected to an input link of the right four-bar linkage.

4. The robotic joint of claim 3, wherein the left and right four-bar linkages each comprise an output link coupled to the input link via a connecting link and wherein the output links each pivot at an end distal to the connecting link, the pitch axis passing through the pivot end of the output links.

5. The robotic joint of claim 1, wherein first and second linear actuators are independently and concurrently operable such that the rotation of the output gear about the output roll axis and the rotation of the cross element about the pitch axis are concurrent or sequential.

6. The robotic joint of claim 5, where the range of rotation of the output gear about the output roll axis is in the range of about 155 to about 180 degrees and the range of motion of the cross element about the pitch axis is in the range of about 60 to about 90 degrees.

7. The robotic joint of claim 1, wherein the input roll axis, the pitch axis, and the output roll axis intersect within the differential mechanism.

8. The robotic joint of claim 7, wherein actuator mechanism of the input roll assembly comprises an electric linear actuator and the input roll assembly further comprises an input roll axle supporting the housing of the pitch-output roll assembly and a four-bar linkage with an output link connected to the housing of the pitch-output roll assembly and an input link driven by the electric linear actuator to selectively rotate the housing about input roll axle, the input roll axis extending through the input roll axle.

9. A robotic joint for use as a shoulder or other joint, comprising:
   first, second, and third rotary outputs arranged in an input roll-pitch-output roll configuration with substantially intersecting input roll, pitch, and output roll axes; and
   first, second, and third linear actuators operating the rotary outputs,
   wherein the first rotary output comprises a housing pivotally mounted to rotate about the input roll axis and a four-bar linkage with an output link connected to the housing and wherein the first linear actuator comprises an electric linear actuator selectively operable to drive the four-bar linkage to provide input roll in the robotic joint.

10. The robotic joint of claim 9, wherein the robotic joint has a pitch angle of at least about 60 degrees and a roll angle of at least about 120 degrees.

11. A robotic joint for use as a shoulder or other joint, comprising:
   first, second, and third rotary outputs arranged in an input roll-pitch-output roll configuration with substantially intersecting input roll, pitch, and output roll axes; and
   first, second, and third linear actuators operating the rotary outputs,
   wherein the second and third rotary outputs comprise a differential mechanism including a left side gear, a right side gear, an output gear, a cross element interconnecting the gears, and a output pitch-roll structure supporting the gears and the cross element within the housing and wherein the second and third linear actuators operate to selectively rotate the left and right side gears, respectively, to cause the output gear to rotate about the output roll axis and the cross element and the interconnected output pitch-roll structure to rotate about the pitch axis.

12. The robotic joint of claim 11, wherein the second linear actuator drives the left side gear using a four-bar linkage coupled with the left side gear and the third linear actuator drives the right side gear using a four-bar linkage coupled with the right side gear.

13. The robotic joint of claim 11, wherein the gears of the differential mechanism are selected from the group of gears consisting of bevel gears, spiral bevel gears, hypoid gears, miter gears, zerol gears, cable differentials, and friction cones.

14. A robotic joint for use as a shoulder or other joint, comprising:
   first, second, and third rotary outputs arranged in an input roll-pitch-output roll configuration with substantially intersecting input roll, pitch, and output roll axes; and
   first, second, and third linear actuators operating the rotary outputs,
   wherein the second and third rotary outputs comprise a geared differential mechanism driven by the second and third linear actuators to provide concurrent and independent rotation about the pitch and output roll axes.

15. The robotic joint of claim 14, wherein first and second input gears of the geared differential are driven by the second and third linear actuators through four-bar linkages attached to the first and second input gears and wherein the output roll axis extends through an output gear of the geared differential mechanism mating with the first and second input gears and the pitch axis extends through the first and second input gears.

16. A robotic joint, comprising:
   a geared differential comprising a first input gear, an output gear, and a second input gear interconnected by a cross element;
   an output element mounted to the output gear to rotate with the output gear about an output roll axis; and
   a first linear actuator selectively driving the first input gear and a second linear actuator selectively driving the second input gear to provide the rotation of the output gear and to provide rotation of the robotic joint about a pitch axis extending through the input gears.

17. The robotic joint of claim 16, further comprising a first four-bar linkage connected to the first input gear and to an actuator arm of the first linear actuator and comprising a second four-bar linkage connected to the second input gear and to an actuator arm of the second linear actuator.

18. The robotic joint of claim 16, wherein the output roll axis and the pitch axis intersect in the cross element.

19. The robotic joint of claim 16, further comprising:
   a housing supporting the geared differential and pivotally mounted to rotate about an input roll axis extending through the housing and substantially intersecting both the output roll axis and the pitch axis; and
   an input roll assembly including a linear actuator selectively rotating the housing about the input roll axis,
   wherein the input roll assembly further includes a four-bar linkage with an input link connected to the linear actuator of the input roll assembly and with an output link connected to the housing.

* * * * *